(12) United States Patent
Reda et al.

(10) Patent No.: US 11,355,842 B2
(45) Date of Patent: Jun. 7, 2022

(54) USER TERMINALS WITH ENHANCED PERFORMANCE AT LOW ELEVATION ANGLES FOR LEO AND GEO SATELLITES

(71) Applicant: UTVATE Corporation, San Francisco, CA (US)

(72) Inventors: Amin Reda, Oakland, CA (US); Siamak Ebadi, San Francisco, CA (US); Andres Felipe Osorio, Emeryville, CA (US); Stefan William Turkowski, Oakland, CA (US)

(73) Assignee: UTVATE Corporation, San Francisco, CA (US)

( * ) Notice: Subject to any disclaimer, the term of this patent is extended or adjusted under 35 U.S.C. 154(b) by 0 days.

(21) Appl. No.: 17/542,359

(22) Filed: Dec. 3, 2021

(65) Prior Publication Data

US 2022/0094054 A1  Mar. 24, 2022

Related U.S. Application Data

(63) Continuation of application No. 17/100,760, filed on Nov. 20, 2020, now Pat. No. 11,223,127.
(Continued)

(51) Int. Cl.
*H01Q 3/24* (2006.01)
*H01Q 3/26* (2006.01)
(Continued)

(52) U.S. Cl.
CPC .............. *H01Q 3/32* (2013.01); *H01Q 19/18* (2013.01); *H04B 17/318* (2015.01)

(58) Field of Classification Search
CPC .. H04B 7/185; H04B 7/1851; H04B 7/18519; H04B 17/30; H04B 17/309;
(Continued)

(56) References Cited

U.S. PATENT DOCUMENTS

2019/0020117 A1   1/2019  Cohen
2019/0089067 A1*  3/2019  Zihir ...................... H01Q 21/22
(Continued)

FOREIGN PATENT DOCUMENTS

WO     2013/120032 A1    8/2013

OTHER PUBLICATIONS

International Search Report in PCT International Application No. PCT/US2021/014022, dated Mar. 3, 2021.
(Continued)

*Primary Examiner* — Blane J Jackson
(74) *Attorney, Agent, or Firm* — Cognition IP, P.C.; Edward Steakley

(57) ABSTRACT

Disclosed embodiments relate to communicating with satellites at any elevation. In one example, an antenna system includes two or more user terminal panels (UTPs). Each of the UTPs include multiple user terminal modules (UTMs). The UTPs may be arranged in either a fixed, an adjustable geometry or a combination thereof. A UTM has multiple user terminal elements (UTEs) that include antennas and active circuits. An antenna may either generate an incoming signal in response to incident radio waves received from a satellite and/or may transmit an outgoing signal toward the satellite. Each active circuit is configured to process the incoming and outgoing signals. Also, the antenna system may include a control circuit configured to control signal processing performed by the active circuits. The UTPs may be operably connected to a single satellite, or different UTPs may be operably connected to different satellites.

30 Claims, 25 Drawing Sheets

Related U.S. Application Data

(60) Provisional application No. 63/060,101, filed on Aug. 2, 2020, provisional application No. 63/019,228, filed on May 1, 2020, provisional application No. 62/964,376, filed on Jan. 22, 2020.

(51) Int. Cl.
  *H01Q 3/32* (2006.01)
  *H04B 17/318* (2015.01)
  *H01Q 19/18* (2006.01)

(58) Field of Classification Search
  CPC .......... H04B 17/318; H01Q 1/28; H01Q 1/42; H01Q 3/32; H01Q 3/34; H01Q 19/18; H01Q 21/00; H01Q 21/22; H01Q 1/24; H01Q 1/26; H01Q 3/24; H01Q 3/26; H04W 16/28
  See application file for complete search history.

(56) References Cited

U.S. PATENT DOCUMENTS

| | | |
|---|---|---|
| 2019/0237873 A1 | 8/2019 | Sazegar et al. |
| 2019/0252796 A1 | 8/2019 | Mahanfar et al. |
| 2019/0280387 A1 | 9/2019 | Posthuma et al. |
| 2019/0372656 A1* | 12/2019 | Fang .................. H01Q 21/0025 |

OTHER PUBLICATIONS

U.S. Appl. No. 16/858,691, filed Apr. 26, 2020 "Antenna Modules in Phase Array Antennas."

\* cited by examiner

USER TERMINALS WITH ENHANCED PERFORMANCE AT LOW ELEVATION ANGLES FOR LEO AND GEO SATELLITES

CROSS-REFERENCE TO RELATED APPLICATIONS

This application is a continuation of U.S. application Ser. No. 17/100,760, filed Nov. 20, 2020, which claims the benefit of U.S. Provisional Application No. 62/964,376, filed Jan. 22, 2020, U.S. Provisional Application No. 63/019,228, filed May 1, 2020, and U.S. Provisional Application No. 63/060,101, filed Aug. 2, 2020, which are hereby incorporated by reference in their entirety.

TECHNICAL FIELD

Aspects of the disclosure are related to the field of beam-scanning antenna systems, low scan loss at low elevation, and in particular, to flat panel antennas for communication with satellites at any elevation.

BACKGROUND

The global space ground station equipment market is projected to grow at a significant rate, reaching a market value of $119.78 billion by 2024, according to the Jan. 24, 2020 report from Globe Newswire entitled "Global Space Ground Station Equipment Markets to 2024: Focus on Equipment, End-user, Application, and Satellite Communication Service." Parabolic reflector antennas are most common in today's market. Parabolic reflector antennas, however, include a parabolic reflector that can be costly to manufacture, and, which, in conjunction with the requisite feed system and supporting structure, can result in a bulky and heavy antenna. In some ways, parabolic reflector antennas are becoming increasingly impractical. For example, the shape and form factor of parabolic reflector antennas results in expensive shipping and transportation to different parts of the world.

SUMMARY

One or more embodiments described herein, among other benefits, solve one or more of the foregoing or other problems in the art by providing systems, apparatuses, and methods for providing inexpensive and reusable (or interchangeable) antenna elements combinable into high-performance modular electronically scanned array antenna systems that are configurable for various commercial and consumer beam-scanning communication applications, and are able to communicate with a satellite located at any elevation from 0 to 90 degrees.

In one embodiment, a flat panel array (FPA) antenna includes P user terminal panels (UTPs), each UTP including N user terminal modules (UTMs), together including M user terminal elements (UTEs). The M UTEs include M antennas and M active circuits, the antenna either to generate an incoming signal in response to incident radio waves received from a satellite, or to transmit an outgoing signal toward the satellite, and the active circuit to process the incoming and outgoing signals. The FPA antenna further includes a control circuit to control signal processing performed by the M active circuits. Advantageously, N and M can be adjusted so that an effective antenna area visible to the satellite and a corresponding throughput of a connection thereto can be adjusted to maintain the connection, the satellite being located at any elevation between zero and ninety degrees.

In another embodiment, a satellite antenna system includes M application-agnostic user terminal elements (UTEs), each including an antenna either to generate an incoming signal in response to incident satellite radio waves or to transmit an outgoing signal toward a receiver, such as a satellite or a ground unit. Each UTE further includes active circuitry to process the incoming and outgoing signals. The UTE active circuits are controlled by control circuitry, which controls the processing performed by the M active. In some embodiments, the M UTEs are distributed among N user terminal modules (UTMs), which each include a daisy-chain of O of the M active circuits. An example of such a system is illustrated and described with respect to FIG. 9, showing a satellite antenna system in which M equals 256, and N and O equal 16.

To address the potential quality degradation and signal attenuation that can arise along the stages of the daisy-chain, each UTM further includes a buffer placed after every P active circuits, in order to correct any amplitude degradation that has occurred in the daisy-chain. In other words, a buffer can be placed after every P active circuits in order to correct a signal characteristic that has degraded as the signal traverses the daisy-chain. In other words, a buffer can be placed after every P active circuits in order to correct degradations in signal characteristics. An example of such a UTM is illustrated in FIG. 10, showing a UTM with 16 UTEs, and with a buffer placed between every 16 UTEs.

An advantage of such a system, as disclosed herein, is that because of its modular design, M can be adjusted to adjust a total antenna area and a corresponding signal throughput available to an application. For example, for a satellite antenna system intended for use in an automobile application, M can be set to a lower number than it would be in a more demanding application, such as a bus, an airplane, or a cruise ship. NRE costs are minimized in such systems insofar as the UTEs have been designed in the past and are being reused.

Additional features and advantages of the present application will be set forth in the description which follows, and in part will be obvious from the description, or may be learned by the practice of such example embodiments.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

Figure 1:
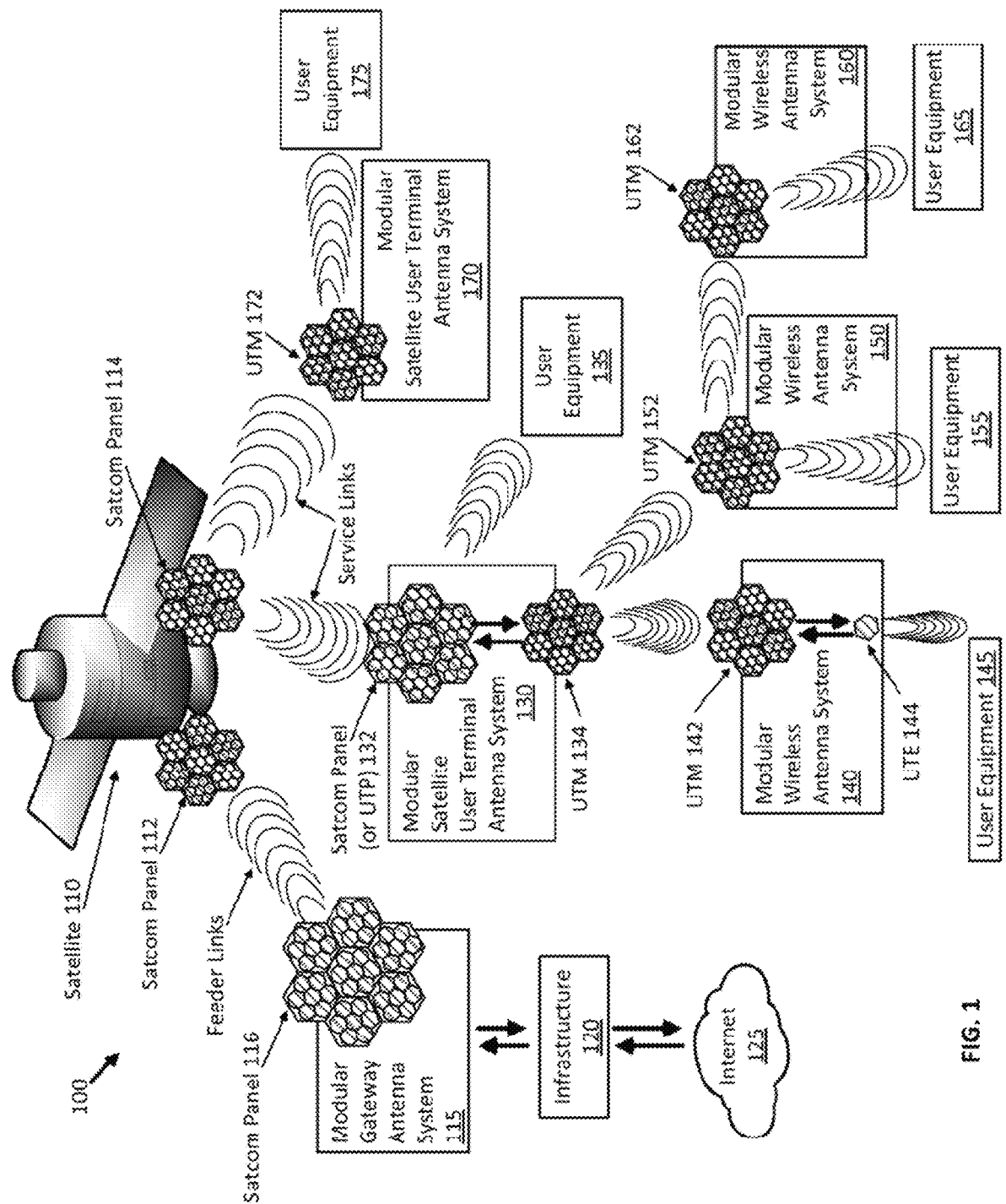
FIG. 1 depicts a block diagram illustrating a general overview and architecture of an example satellite communication system including various modular antenna array systems, according to some implementations.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may include systems, processes, apparatuses, machine-implemented methods, computing devices, or computer readable medium.

As discussed above, parabolic reflector antennas are most common in today's global space ground terminal equipment market. However, parabolic reflector antennas can be bulky and heavy and are becoming more impractical. For example, the shape and form factor of parabolic reflector antennas results in expensive shipping to different parts of the world.

In some embodiments, the disclosed flat panel array (FPA) antenna is also referred to as an Antenna System. Disclosed embodiments of the FPA antenna include either a flat surface single panel or various geometrical shapes formed with multiple antenna panels.

The invention described herein and illustrated in the figures addresses the problems faced by parabolic reflector antennas. In one embodiment, an FPA antenna includes a plurality of N UTMs, together including M UTEs. The M UTEs together include M antennas and M active circuits. Each antenna is either to generate an incoming signal in response to incident radio waves received from a satellite, or to transmit an outgoing signal toward the satellite. The active circuit is to process the incoming and outgoing signals. The FPA antenna further includes a control circuit to control signal processing performed by the M active circuits. Advantageously, N and M can be adjusted so that an effective antenna area visible to the satellite and a corresponding throughput of a connection thereto can be adjusted to maintain the connection, with the satellite being located at any elevation between zero and ninety degrees.

As described below with respect to the method illustrated in FIG. 8A and FIG. 8B, the disclosed FPA antenna can be used to connect with satellites at any elevation. One such example of such a method includes placing the FPA antenna in a position, the FPA antenna including a plurality of N UTMs, the N UTMs together including M UTEs (user terminal elements), the M UTEs including M antennas and M active circuits. The antenna is either to generate an incoming signal in response to incident radio waves received from a satellite, or to transmit an outgoing signal toward the satellite. The active circuit to process the incoming and outgoing signals. In this example, the FPA antenna further includes one or more sensors to measure the connection signal strength to the satellite. This example includes the control circuit determining whether a total connection signal strength measured by the one or more sensors meets a signal strength requirement, and if not, adjusting one or more of N, M, and the position to adjust an effective antenna area visible to the satellite until the signal strength meets the requirement. In this example, the satellite can be located at any elevation between zero and ninety degrees.

In some embodiments, the term "scan loss" is used to describe the reverse of the term "gain." Further, scan loss is defined as the difference between the gain of the antenna at any elevation angle compared with the maximum gain, which takes place at the normal angle with respect to the antenna panel(s). For a flat panel laying on the ground, that maximum happens at 90-degree elevation.

Advantages of Disclosed FPA Antenna Over Parabolic Reflector Antenna

The disclosed FPA antenna has several advantages over parabolic reflector antennas commonly used today, which are typically large, heavy, and expensive. Parabolic reflector antennas typically include several components, to name just a few: 1) The main parabolic reflector which can be several meters in diameter, 2) the illuminating horn, which needs to be spaced by the focal length, and 3) a mechanical system to support all components. Together, these components typically yield a heavy, bulky antenna.

In a first point of contrast, the disclosed FPA antenna uses components that are simpler to manufacture: large parabolas are more difficult to build. The disclosed FPA antenna further advantageously uses application agnostic UTEs, which can be produced in volume and are thus less expensive. The benefits of application agnostic components are further discussed below.

Further, the disclosed FPA antenna benefits from electronic steering and can better handle multiple satellites at disparate elevations. Parabolic reflector antennas are often slower to steer the beam than the disclosed FPA antenna, which can steer the beam in a manner of milliseconds.

Further, the disclosed FPA antenna benefits from electronic steering and can handle multiple satellites at disparate elevations simultaneously.

Furthermore, parabolic reflector antennas have maintenance challenges due to their high precision mechanical positioners whereas many of the disclosed FPA antennas have no mechanical positioners. Also, FPA antennas experience significantly less wind speed challenges due to their flat nature.

Also, parabolic reflector antennas typically include moving parts, which can cause failures, such as degradation over time, and shorter lifetime. The disclosed FPA antennas, at least those with fixed geometries, such as FPA antennas 552, 554, 556, 558, 560, and 562 of FIG. 5B, do not contain any moving parts that can fail over time.

Additional Advantageous Features of Disclosed FPA Antennas

As will be described below and illustrated in the figures, the disclosed FPA antennas have several advantageous features and capabilities, especially when compared to parabolic reflector antennas. For example, in one aspect of the invention, the disclosed FPA antennas can connect with multiple satellites simultaneously in a multi-beam communication, with the satellites being located at any elevation from 0 degrees to 90 degrees. Furthermore, the disclosed FPA antennas can measure the signal strength of the connection to the satellite and respond to any shortfalls in several ways, such as changing the geometry of the antenna to alter the effective antenna area visible to the satellite. Disclosed FPA antenna embodiments can be advantageously applied in countless contexts, including ground stations, earth terminals, mobility applications such as cars and trains and any of the terrestrial radio stations illustrated in FIGS. 1, 2A, and 2B.

In some embodiments, the disclosed FPA antenna has a user interface that allows programming of the control circuit. The user interface can be used by a user to enter location indication of a satellite. The location indication includes an azimuth, starting at 0 degrees at true north and rotating clockwise to reach 360 degrees. The user interface can also be used to enter elevation, starting at 0 degrees at the horizon, and rising to 90 degrees straight above and pointing to the sky.

Figure 5A:
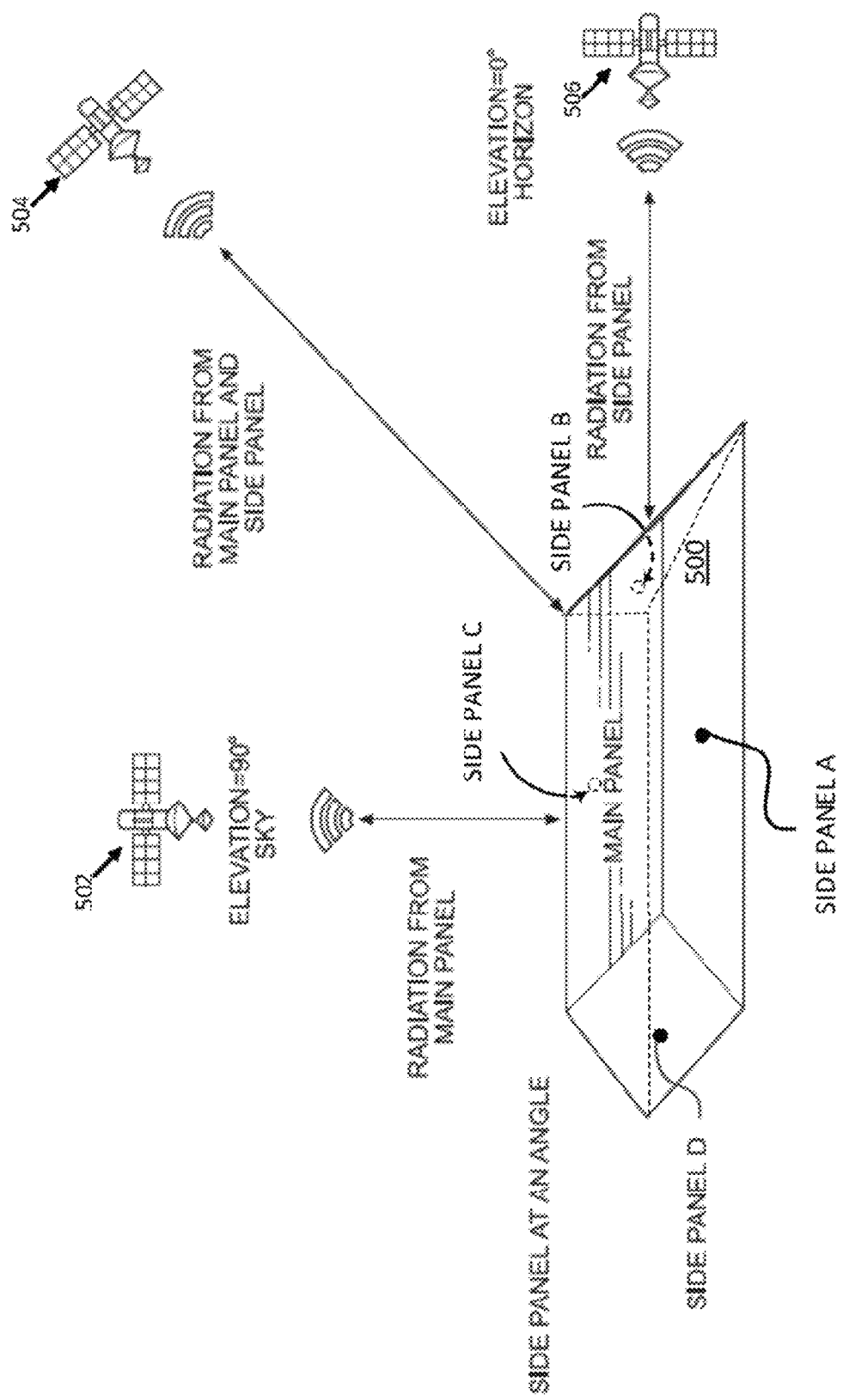
FIG. 5A illustrates an antenna system comprising multiple Antenna Panels communicating with satellites at various different elevations, according to some embodiments.
Figure 5B:
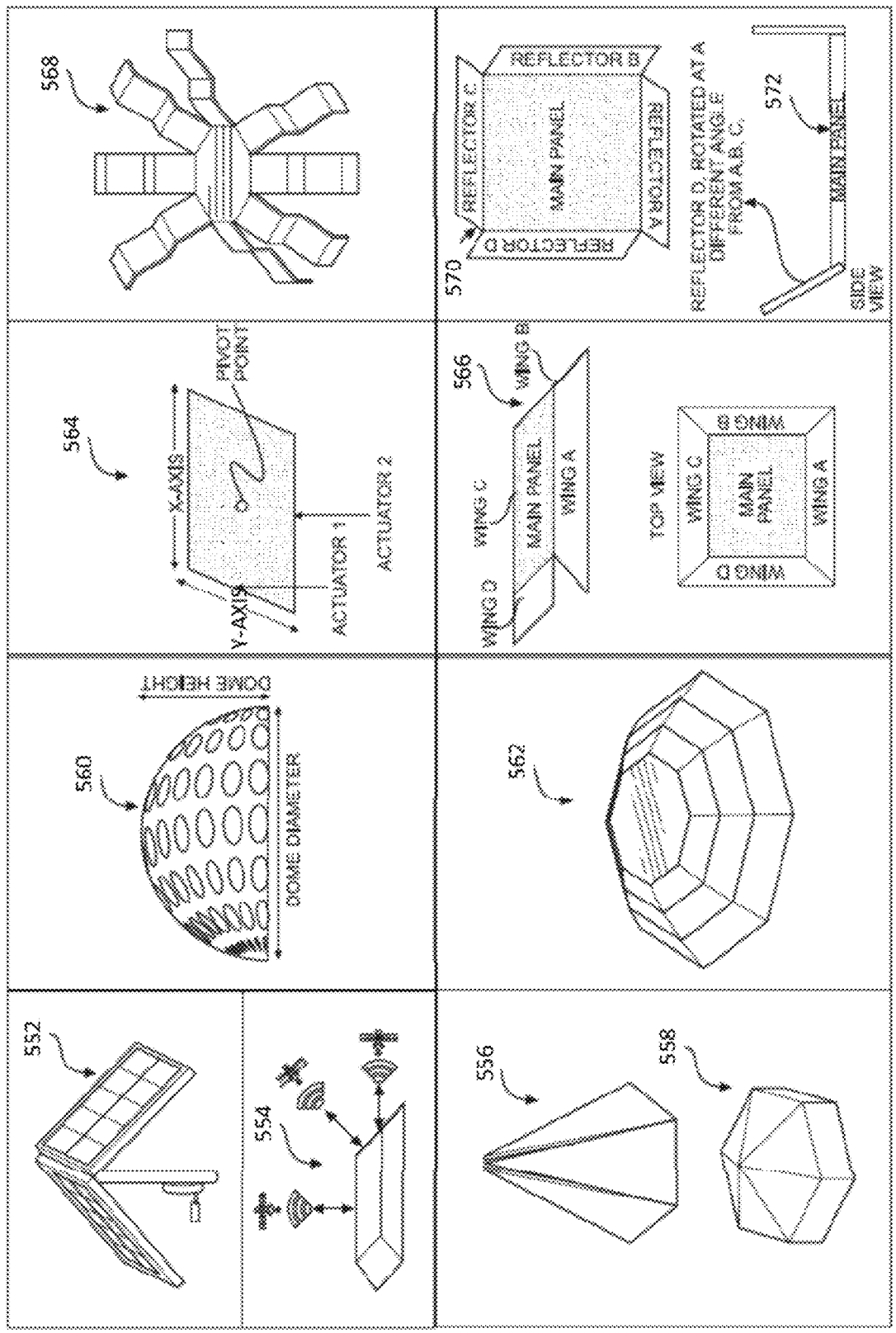
FIG. 5B illustrates several antenna systems, according to some embodiments.
Figure 6:
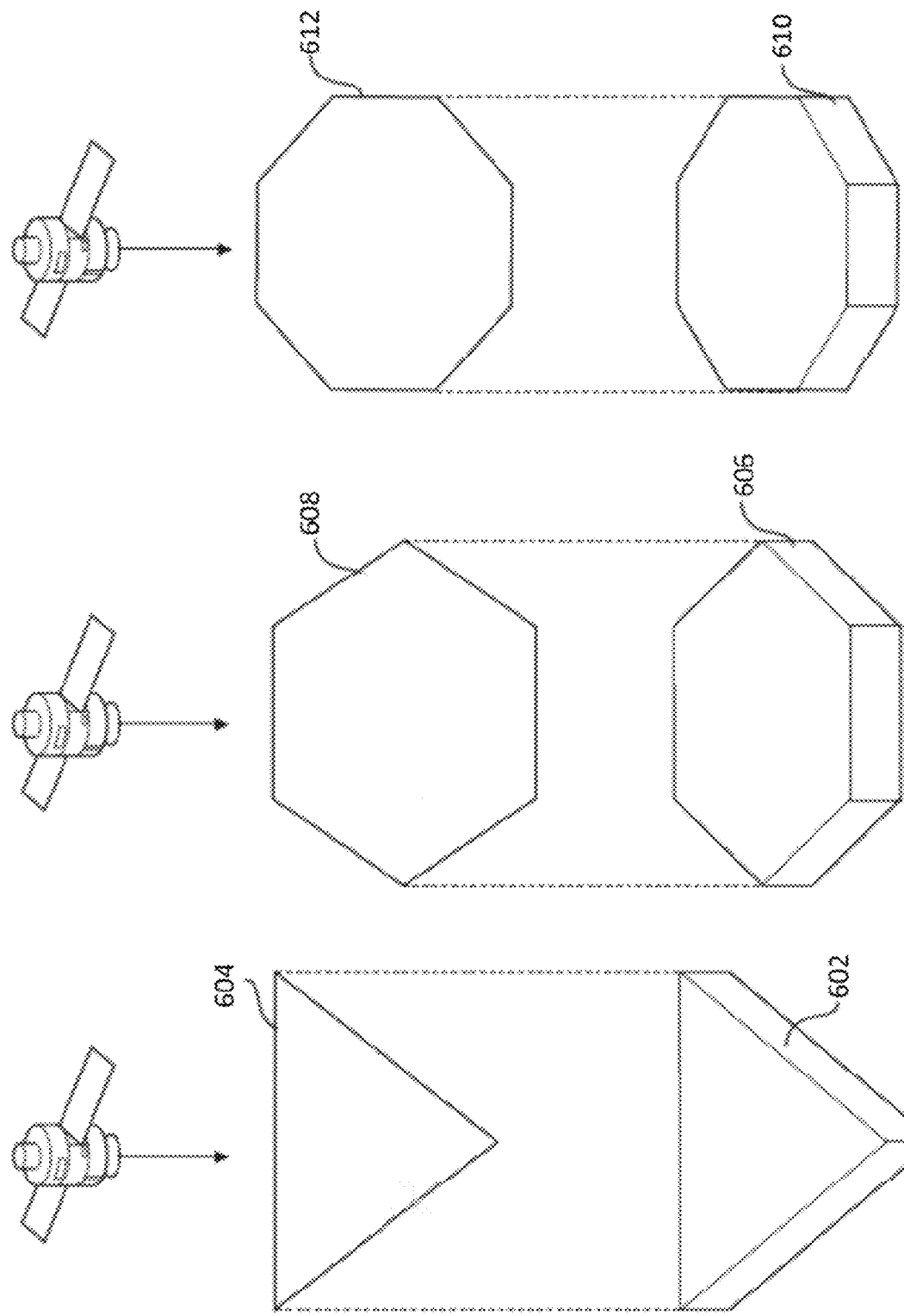
FIG. 6 illustrates several embodiments of effective antenna areas of flat panel array antennas as seen by the satellite.

FIG. 5A, FIG. 5B, and FIG. 6 illustrate several examples of antenna systems having multiple panel sides. As used herein, the effective satellite area, as illustrated in FIG. 6, consists of a sum of projected surface areas of each of the panels sides as visible to the satellite, each projected area being a rectilinear projection of panel side surface onto an arbitrary plane perpendicular to a line of sight to the satellite.

In some embodiments, the disclosed antenna has a fixed geometric shape, for example as shown as FPA antennas 554, 556, 558, 560, and 562 of FIG. 5B. Such fixed geometric-shaped antennas include some antenna surfaces that can communicate with satellites at 0 degrees of elevation. In some embodiments, the disclosed antenna has a combination of one antenna surface 1902 and feed horns including flared metal waveguides 1904 shown in FIG. 19.

In some embodiments, the disclosed FPA antenna has an adjustable tent geometry 552 where the ridge height can be set in accordance to the location of the satellites with which the FPA antenna is intended to communicate. In other embodiments (not shown), multiple tents are used in order to increase the effective area of the FPA antenna and decrease the scan loss.

In other embodiments, the disclosed FPA antennas have a main panel, and multiple, moveable side panels, for example as shown as FPA antennas 564, 566, 568, and 570 of FIG. 5B. In such embodiments, the FPA antenna can use actuators to move one or more side panels to maximize the effective antenna area visible to the satellite. In such embodiments, individual side panels can be dedicated to a satellite, combined with other side panels, and switch between multiple satellites.

The disclosed FPA antennas can also form a multibeam connection to multiple satellites, each satellite having its own effective antenna area.

In another advantageous aspect of the invention, the disclosed FPA antennas are able to connect with satellites disposed at any elevation 0 degrees and 90 degrees. To do so, some embodiments arrange multiple FPA into a three-dimensional shape, for example in the shape of several fixed geometry objects illustrated in FIG. 5B, so as to be able to have an antenna surface visible to the satellite. Some embodiments, as also shown in FIG. 5B, have moveable side panels that can be adjusted using actuators to maximize the surface area visible to the satellite. Some embodiments, for example as illustrated as antenna 572 of FIG. 5B, include one or more reflectors to focus the satellite connection on the main panel. Generally, in any disclosed FPA antenna having multiple side panels, inactive panels can be disabled to reduce power consumption.

Cost Benefits of Application-Agnostic UTEs

The limited availability and affordability of satellite ground antenna systems is further exacerbated by the way they are manufactured. Conventional antenna systems are custom designed for particular applications. Such custom-designed projects typically require extensive one-time engineering effort, which are NRE costs. Such antenna systems are also typically produced in relatively small volumes, resulting in high costs per unit. An example of such a satellite internet system available today is made by Gogo LLC, of Chicago, Ill., who provides satellite internet systems for use on airplanes. Antenna systems from Gogo LLC can cost hundreds of thousands of dollars, which in today's dollars is tantamount to the price of a house.

In contrast, the technology described herein is directed to antenna elements for modular antenna systems. More specifically, the technology is directed to inexpensive, reusable, and interchangeable antenna elements that are combinable into modular electronically scanned array antenna systems. Antenna systems described herein can be constructed from application-agnostic antenna elements that are designed just once. Such an approach minimizes NRE costs, facilitates bulk production, and significantly reduces per-unit costs. Indeed, the antenna elements described herein are combinable into modular electronically scanned array antenna systems that are configurable into various sizes and capabilities for any variety of high-performance commercial or consumer beam-scanning applications such as, for example, satellite communication applications, 5G cellular communication applications, automotive radar, and IoT applications, etc.

As an example of advantageously reusing a design of a UTE to reduce NRE costs associated with a beam-scanning satellite, in some embodiments, a UTE can be designed just once, and an antenna system can be implemented that contains one of a first number of UTEs placed in an automobile, a second number of UTEs placed on a bus, a third number of UTEs placed on an airplane, and a fourth number of UTEs placed on a cruise ship, wherein the first, the second, the third, and the fourth numbers of UTEs are progressively increasing.

In some implementations, the technology described herein enables widespread usage of satellite connectivity by significantly reducing the cost of electronically scanned array antenna systems for satellite user terminals. Indeed, the techniques disclosed herein reduce NRE costs, which in combination with high volume construction enable high performance, sub $100 user terminals that can deliver transfer speeds greater than one Gbps. In other words, M UTEs can be manufactured in bulk such that a manufacturing cost of each UTE is tantamount to an average manufacturer suggested retail price of a commercially available personal computer, which is more affordable that, say, a Gogo business wireless satellite system, which, as described above, has a cost that is tantamount to that of a house. Consequently, in addition to serving existing markets, this technology also facilitates new, non-existing markets that cannot currently afford access to high-speed internet connectivity.

Among other benefits, the modular antenna systems and solutions described herein facilitate flat beam-steerable antennas that are inexpensive, reusable, interchangeable, and modular. As mentioned above, disclosed UTEs can be designed just once, without considering a final form factor. With such an approach, NRE costs associated with UTEs are low, enabling an antenna system that is suitable for any high-performance commercial or consumer beam-scanning applications, such as, for example, satellite communication applications, 5G cellular communication applications, automotive radar, or IoT applications, etc. Indeed, the modular antenna systems and solutions described herein enable widespread usage of satellite connectivity by significantly reducing the cost of phased arrays for satellite user terminals. The improvements described herein drastically decrease the overall costs of beam-scanning array antennas as the modular antenna elements can be built at high volume. Additionally, the array designs reduce complexity of the base board further reducing overall costs of the system. As a result, the systems and solutions described herein not only serve existing markets, but also enable new, non-existing markets that currently do not have access to high-speed connectivity.

Additionally, the modularity and reusability of the designs discussed herein enable rapid scalability to various form factors, improving time-to-market. Indeed, new systems and solutions can be deployed in a matter of weeks using the building blocks disclosed herein.

As mentioned above, a disclosed satellite antenna system includes M UTEs, each being application-agnostic and including an antenna either to generate an incoming signal in response to incident satellite radio waves or to transmit an outgoing signal toward a receiver, such as a satellite, a ground unit, multiple satellites, multiple ground units, and any combination thereof. As used herein, the term "application-agnostic" means the same UTE can be used in any application, be it, for example, a car, a bus, or a cruise ship.

As used herein, the term "electronically scanned array" refers to an electronically scanned array, or a computer-controlled array of antennas which creates a beam of radio waves that can be electronically steered to point in different directions without moving the antennas. It should be understood that the array may be controlled by any of a computer, a microcontroller, or an onboard processor As used herein, the term "die" is used in the context of integrated circuits and refers to a small block of semiconducting material on which a functional circuit is fabricated. Integrated circuits are typically produced in large batches on a single wafer of electronic-grade silicon or other semiconductor through processes such as photolithography.

As used herein, the term "integrated circuit packaging" refers to the final stage of semiconductor device fabrication, in which the block of semiconductor material is encapsulated in a supporting case that prevents physical damage and corrosion. The case, known as a "package," supports the electrical contacts which connect the device to a circuit board. As discussed herein, package material is typically very lossy at RF frequencies and, as a result, degrades RF signals that pass therethrough (e.g., from a die to the outside environment of the package).

A general overview and architecture of an example satellite communication system using various modular antenna systems for facilitating satellite and ground-to-ground communications is described in relation to FIG. 1. Various example environments are described in relation to FIG. 2A and FIG. 2B. An example illustrating the modular architecture of the electronically scanned array antenna systems including modules and panels constructed using the inexpensive antenna elements is then described in relation to FIG. 3 and FIG. 4, respectively. Examples of flat-panel array antennas with low scan loss at low elevation angles, which have several advantages over parabolic reflector antennas, are described in relation to FIG. 5A-FIG. 8B. Thereafter, a more detailed description of the components, operation and processes of the antenna elements and example modular electronically scanned array antenna systems are described in relation to FIGS. 9-18.

FIG. 1 depicts a block diagram illustrating a general overview and architecture of a satellite communication system 100 including various example modular antenna array systems, according to some implementations. More specifically, the satellite communication system 100 includes various example modular antenna systems configured to establish satellite and ground-to-ground communication links (or connectivity) using electronically scanned antenna arrays formed with inexpensive antenna (or user terminal) elements. As discussed herein, the various example modular antenna array systems reuse the same, or similar, designs, thereby reducing NRE costs associated with each new design, Disclosed antenna elements can also be manufacturers at unprecedented scale to reduce the overall costs of the systems.

Although a single satellite is shown in the satellite communication system 100 of FIG. 1, it is appreciated that the system can include any number of satellites. Moreover, various types of modular antenna array systems are shown for the purposes of illustration, it is appreciated that an architecture may include one or all of the example modular antenna array systems.

As shown in the example of FIG. 1, the satellite communication system 100 includes a satellite 110 and various modular antenna array systems including a modular gateway antenna system 115, modular satellite user terminal antenna system 130 and 170, and modular wireless antenna systems 140, 150 and 160. Each of the various modular antenna array systems includes at least one electronically scanned array antenna. Indeed, the electronically scanned array antennas are modular and, thus, can be formed in various sizes and capabilities using the inexpensive, reusable, and interchangeable antenna elements discussed herein. Indeed, the interchangeable antenna elements discussed herein are combinable into larger antenna (or user terminal) modules. These antenna (or user terminal) modules are themselves individually configurable as electronically scanned array antennas or, alternatively, combinable into larger antenna (or user terminal) panels for larger high-performance or high-throughput beam-scanning applications such as, for example, satellite communications. As discussed herein, these electronically scanned array antennas utilize the same, or similar, design and manufacturing processes facilitating the ability to build the scanned array antennas at scale and, as a result, drastically decrease the overall costs of the scanned array antenna systems.

In some embodiments, the satellite 110 orbits in a geosynchronous orbit (GO), e.g., geosynchronous equatorial orbit (GEO), or a non-geosynchronous orbit, e.g., low-Earth orbit (LEO) or medium-Earth orbit (MEO). The modular gateway antenna system 115 can be a modular electronically scanned array antenna system that includes a satcom panel 116. Indeed, satcom panel 116 is an antenna (or user terminal) panel formed with multiple antenna (or user terminal) modules which, in turn, is formed with multiple antenna (or user terminal) elements.

As shown in the example of FIG. 1, the modular gateway antenna system 115 and the modular satellite user terminal antenna systems 130 and 170 are in communication with satellite 110. The modular satellite user terminal antenna system 170 is also in communication with user equipment 175. Furthermore, although shown as distinct entities, in some implementations, the modular satellite user terminal antenna system 170 can be integrated or combined with the user equipment 175 into a distinct or single device such as, for example, a mobile device with an integrated satellite transceiver, e.g., antenna (or user terminal) element for communicating directly with satellite 110.

Likewise, the modular satellite user terminal antenna system 130 is also in communication with modular wireless antenna system 140, modular wireless antenna system 150, and user equipment 135. The modular wireless antenna system 140 is in communication with user equipment 145. Modular wireless antenna system 150, in turn, is in communication with user equipment 155 and modular wireless antenna system 160. The modular wireless antenna system 160 is further in communication with user equipment 165.

The user equipment 135, 145, 155, 165 and 175 may be a user device such as a mobile device, a telephone, a smartphone, a tablet, a laptop computer, a computer, a wearable device, a smart watch, an audiovisual device, an Internet-of-things (IoT) device or any device including the capability to communicate with the modular antenna array systems. Additionally, the user equipment 135, 145, 155, 165, and 175 may be a device (e.g., access point, small cell, etc.) that is used to communicate with one or more end user devices (not shown).

In operation, the various example modular antenna array systems communicate with user equipment via bidirectional access links (having a forward access link and return access link). Similarly, the modular wireless antenna system 150 communicates with the modular wireless antenna system 160 via bidirectional access links (having a forward access link and return access link). For example, the bidirectional access link can be an inter-city link, an example of which is shown and discussed in greater detail with reference to FIG. 2A.

The modular gateway antenna system 115 may have access to Internet 125 or one or more other types of public, semiprivate, or private networks. As shown in the example of FIG. 1, modular gateway antenna system 115 is in communication with infrastructure 120, which is capable of accessing the Internet 125 or one or more other types of public, semi-private or private networks. The modular gateway antenna system 115 may also be coupled to various types of communication backhaul, including, for example, landline networks such as optical fiber networks or public switched telephone networks (not shown).

In some implementations, the modular gateway antenna system 115 may communicate with other gateways, through the infrastructure 120 or alternatively may be configured to communicate without using the infrastructure 120. The infrastructure 120 may include, in whole or part, a network control center (NCC), a satellite control center (SCC), a wired and/or wireless core network, and/or any other components or systems used to facilitate operation of and/or communication with the satellite communication system 100.

Communications between the satellite 110 and the modular gateway antenna system 115 in both directions are called feeder links, whereas communications between the satellite 110 and the modular satellite user terminal antenna systems 130 and 170 are called service links in both directions.

Figure 2A:
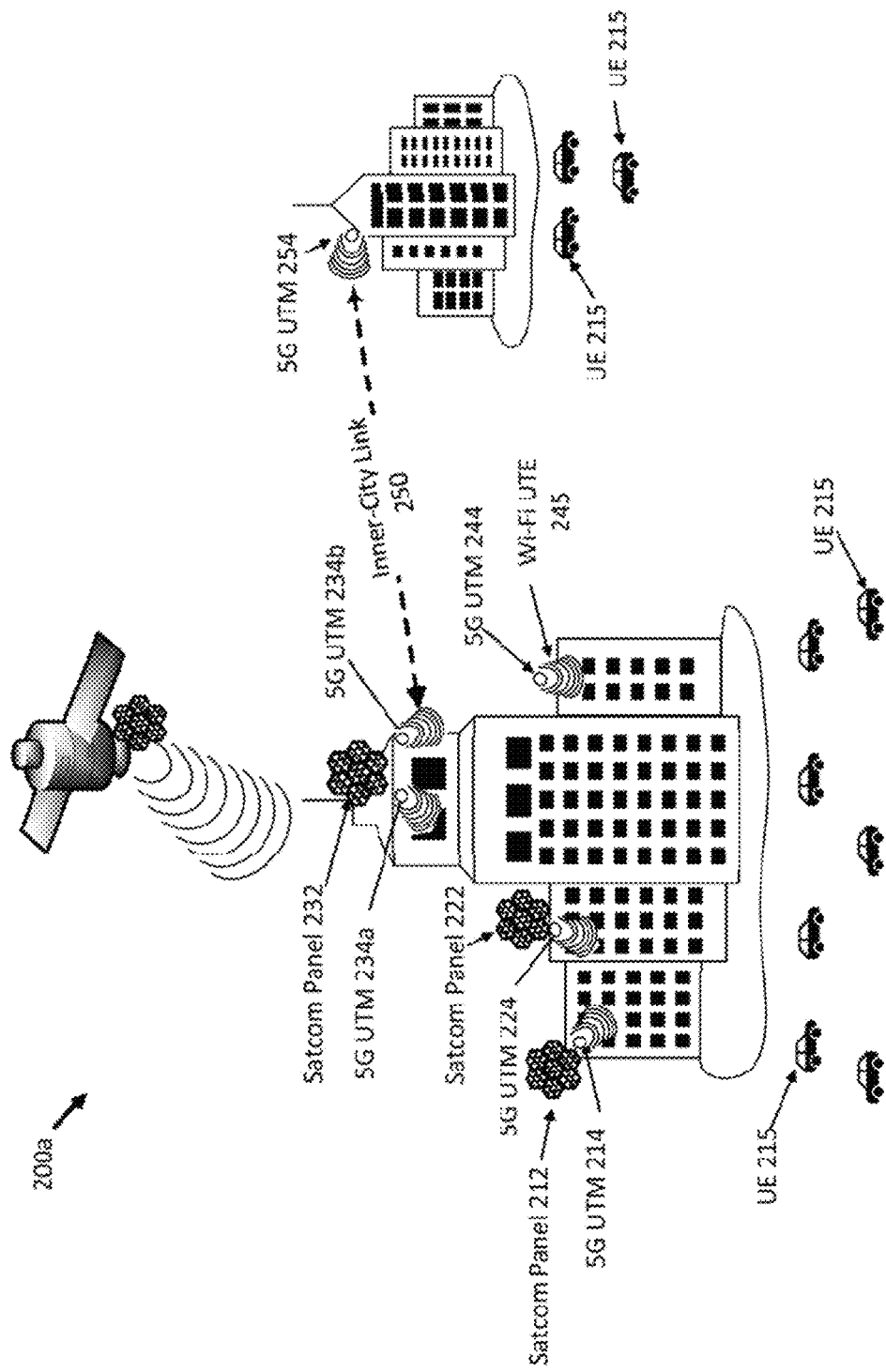
FIG. 2A and FIG. 2B depict block diagrams illustrating example satellite communication systems including various modular antenna systems configured to establish satellite and ground-to-ground communication links (or connectivity) using electronically scanned antenna arrays formed with inexpensive antenna (or user terminal) elements, according to some implementations.
Figure 2B:
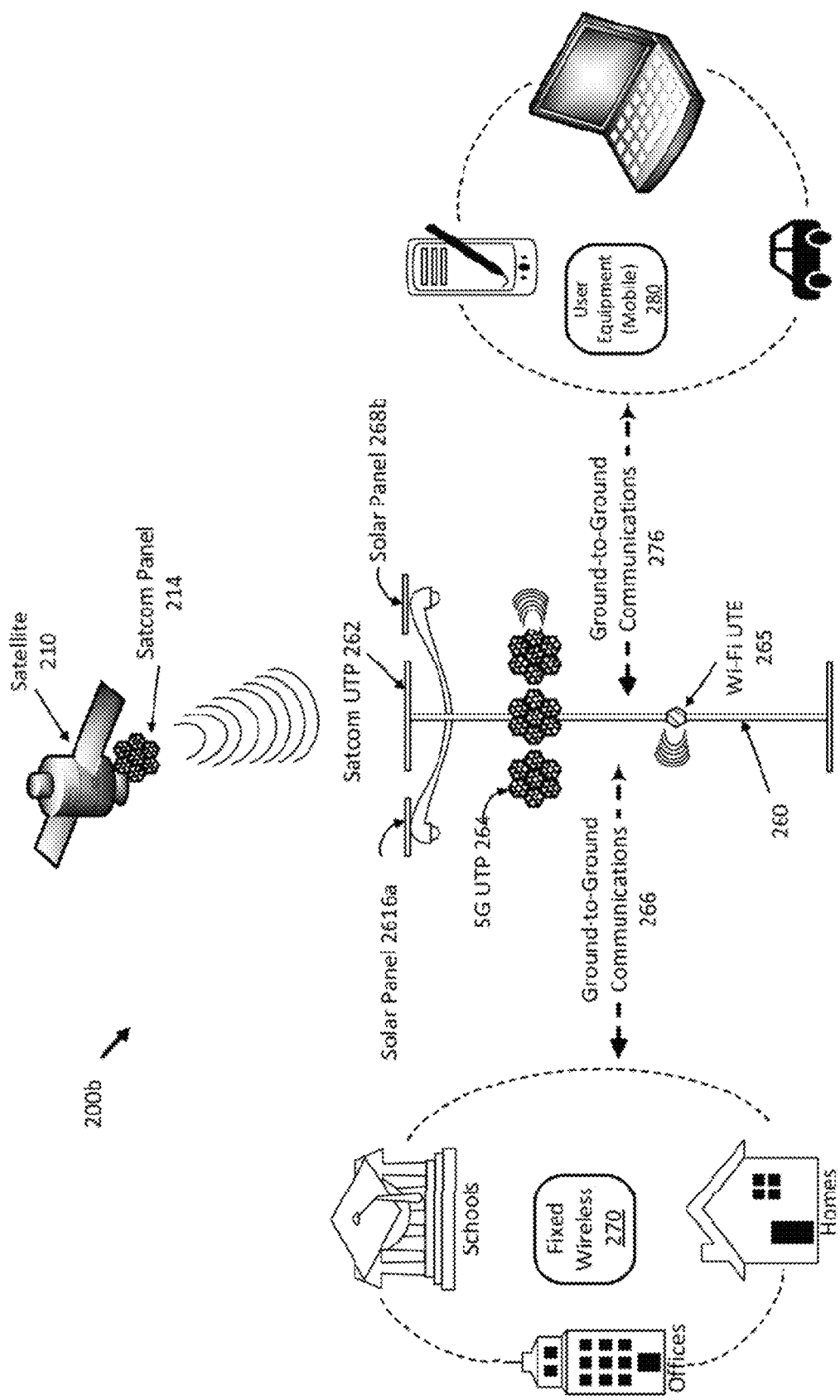

FIG. 2A and FIG. 2B depict block diagrams illustrating examples of satellite communication systems 200a and 200b including various modular antenna systems configured to establish satellite and ground-to-ground communication links (or connectivity) using electronically scanned antenna arrays formed with inexpensive antenna (or user terminal) elements, according to some implementations.

Referring first to the example of FIG. 2A, satellite communication system 200a includes various modular antenna systems configured to establish satellite and ground-toground communication links (or connectivity) using electronically scanned antenna arrays formed with inexpensive antenna (or user terminal) elements. More specifically, the example of FIG. 2A illustrates utilizing the various modular antenna systems discussed herein for providing inter-city connectivity (e.g., inter-city link 250).

FIG. 2B depicts an example whereby infrastructure (e.g., lamppost) 260 can be fitted (or retrofitted) with the modular electronically scanned array antenna systems discussed herein to establish or improve connectivity in a particular area or region. In some implementations, the infrastructure (e.g., lamppost) 260 can be a self-sustained unit. For example, infrastructure 260 can be "plug-and-play" whereby, after installation, the unit is immediately operable for providing connectivity to fixed wireless 270 systems, e.g., nearby homes or schools in a village and other mobile user equipment 280 within range.

Figure 3:
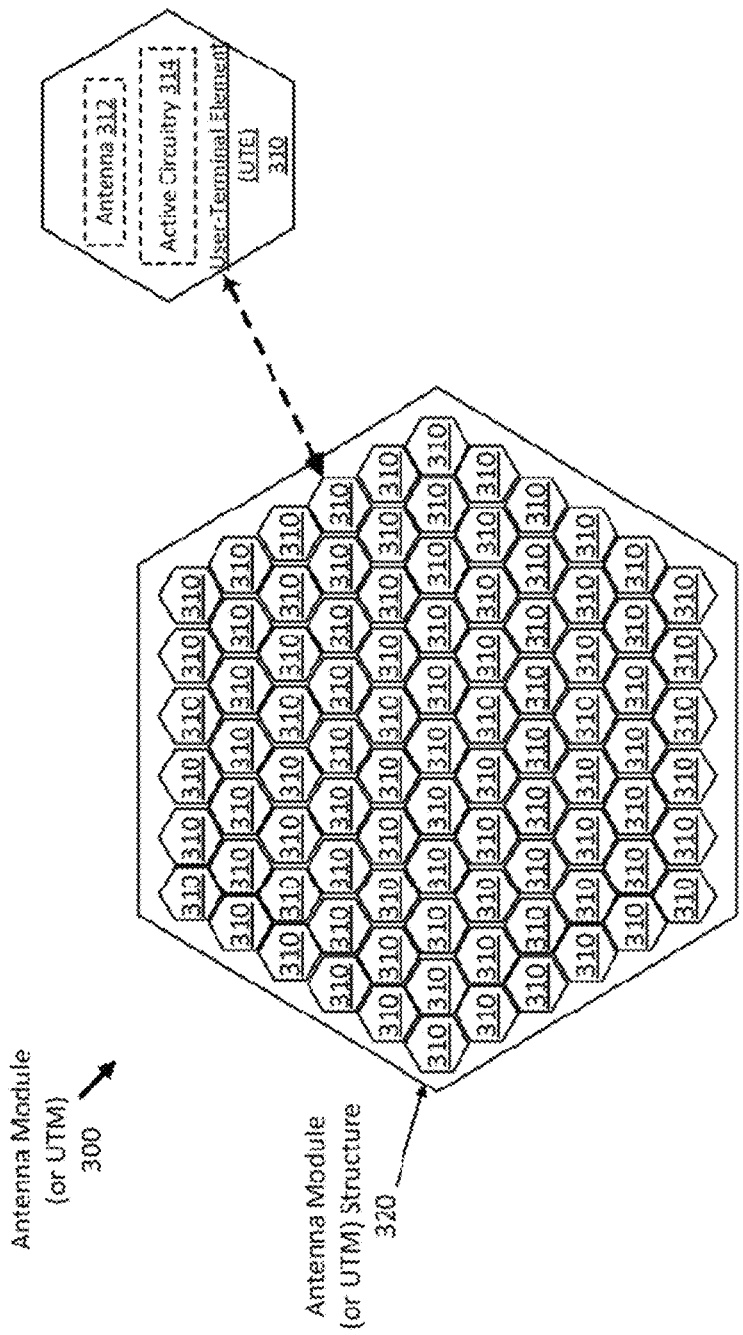
FIG. 3 depicts a block diagram illustrating an example modular architecture of an antenna module formed with multiple antenna (or user terminal) elements, according to some implementations.

FIG. 3 depicts a block diagram illustrating an example modular architecture of an antenna module 300 formed with multiple antenna (or user terminal) elements 310, according to some implementations. More specifically, the example of FIG. 3 illustrates antenna module 300 with an exploded view of example components of antenna (or user terminal) element 310. The antenna module 300 can be any one of the antenna modules shown and discussed with reference to FIG. 1, although alternative configurations are possible. Furthermore, although the antenna (or user terminal) elements 310 and the antenna (or user terminal) module 300 are primarily shown with hexagonal form factors herein, it is appreciated that other form factors (e.g., triangular, square, circular, etc.) are also possible. Additional example antenna (or user terminal) module configurations are shown and discussed in greater detail below.

As shown in the example of FIG. 3, the antenna (or user terminal) module 300 includes multiple antenna (or user terminal) elements 310 placed on or within a structure 320. The antenna (or user terminal) elements 310 can be placed in various configurations on or within the structure 320 to form the antenna module 300. Additional example structures are shown and discussed in greater detail below.

Referring again to FIG. 3, each antenna (or user terminal) element 310 includes a radiator (or antenna) 312 and active circuitry 314. The active circuitry 314 can be embodied in a die and can include various components such as, for example, amplifiers, RF circuitry, digital-to-analog (D/A) converters, analog-to-digital (A/D) converters, etc. Although not shown in the example of FIG. 3, the die is larger than a die from a traditional antenna element. Indeed, in some embodiments, the die has the same (or similar) footprint as the radiator (or antenna) element. As discussed herein, the larger die facilitates integration of various components (e.g., RF circuitry, digital-to-analog (D/A) converters, analog-to-digital (A/D) converters, etc.) that were not previously embodied in a die of a traditional antenna element due to design and size limitations.

As discussed herein, coupling the radiator (or antenna) 312 and the active circuitry 314 traditionally requires at least two and, often, three or more lossy radio frequency (RF) transitions. When stacked on top of each other, these lossy RF transitions result in signal degradation of up to half of the total signal power, e.g., up to three dB. Implementations discussed herein embed or otherwise integrate the radiator (or antenna) 312 with the active circuitry 314 to reduce or eliminate these lossy RF transitions.

Additionally, the antenna elements discussed herein integrate various components into the active circuitry 314 as compared to traditional antenna elements for phased array antenna systems. For example, the antenna elements discussed herein integrate RF circuitry, D/A converters, and A/D converters into the active circuitry 314. Moreover, various components of traditional antenna elements are no longer required (e.g., phase shifters).

In some implementations, the radiator (or antenna) 312 and the active circuitry 314 are integrated or embedded in a single die (e.g., Silicon die) and packaged together in order to eliminate the lossy RF transitions. The single die is referred to herein as an antenna-on-chip (AOC) element. The AOC element may include an application specific integrated circuit (ASIC) which may be packaged as an integrated circuit (IC). The various layers and components of an example AOC element are shown and discussed in greater detail below.

In some implementations, the radiator (or antenna) 312 and the active circuitry 314 are closely integrated but not on a single die (e.g., Silicon die) in order to reduce the lossy RF transitions to a single lossy RF transition while allowing the components of the antenna element to be obtained via tape and reel. Tape and Reel generally refers to a process of packing surface mount devices (SMD's) by loading them into individual pockets of a pocket (or carrier) tape. For example, the units are sealed in the carrier tape with a cover tape, usually by heat or pressure. The carrier tape can then wound around a reel for convenient handling and transport. The reel is enclosed in a reel box before it is finally shipped to the customer. As discussed herein, the ability to obtain components via tape and reel can reduce component costs increasing the ability to create and build antenna elements at scale for module beam-scanning antenna array systems.

Furthermore, closely integrating the radiator (or antenna) 312 and the active circuitry 314, but not on a single die, facilitates use of three-dimensional (3D) printing techniques for printing the radiator (or antenna) 312. Examples illustrating this integration are shown and discussed in greater detail below.

Figure 4:
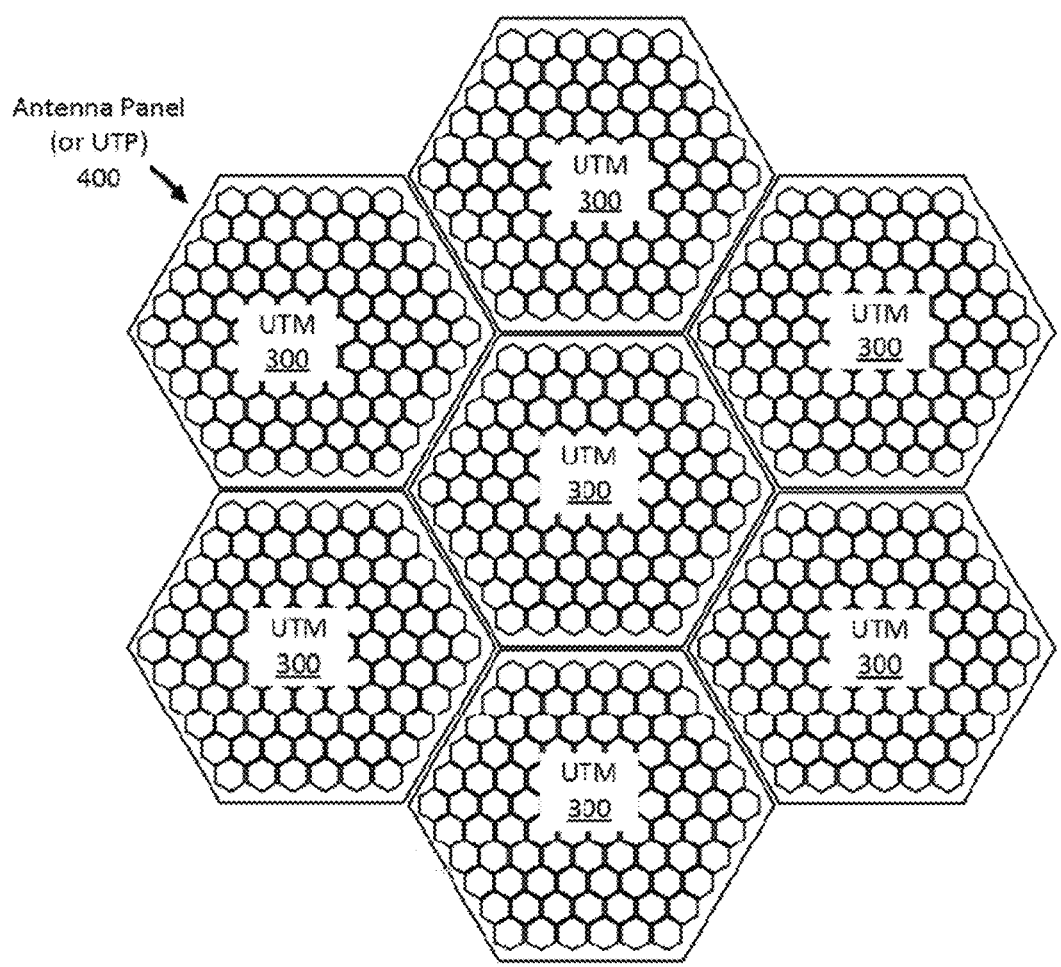
FIG. 4 depicts a block diagram illustrating an example modular architecture of an antenna (or user terminal) panel formed with multiple antenna modules, according to some implementations.

FIG. 4 depicts a block diagram illustrating an example modular architecture of an antenna (or user terminal) panel 400 formed with multiple antenna modules 300, according to some implementations. As used herein antenna panel 400 is sometimes referred to as a UTP (user terminal panel). More specifically, the example of FIG. 4 illustrates the antenna (or user terminal) panel 400 formed with multiple antenna modules 300 of FIG. 3. The antenna (or user terminal) panel 400 can be any one of the antenna panels shown and discussed with reference to FIG. 1 (e.g., satcom panels 112, 114, 116 or 132), although alternative configurations are possible. Furthermore, although the antenna modules 300 are primarily shown with hexagonal form factors herein, it is appreciated that other form factors, e.g., triangular, square, rectangular, circular, etc., including combinations or variations thereof are also possible.

Another benefit of disclosed embodiments is that different user terminal elements can be selected to populate each user terminal module. Most antennas are resonant devices, which operate efficiently over a relatively narrow frequency band. An antenna must be tuned (matched) to the same frequency band as the radio system to which it is connected, otherwise reception and/or transmission will be impaired. Disclosed embodiments allow for each of multiple UTEs to be tuned to one or more of multiple frequency ranges. In some embodiments each of UTEs on a first UTM is tuned to a first frequency range in order to maximize the throughput of radio wave signals communicated at the first frequency range by the UTEs on the first UTM. In some other embodiments, each of UTEs on a first UTM is tuned to a different frequency range in order to maximize a variety of frequency ranges at which radio waves are communicated by the UTEs on the first UTM.

As discussed herein, an antenna (user terminal) panel can be formed or configured from multiple antenna modules based on the particular application. For example, high-performance commercial and consumer beam-scanning applications that require communications over long distances or applications requiring higher levels of throughput may necessitate larger panels. Advantageously, these antenna (or user terminal) panels do not require custom designs as they can be modularly constructed using the interchangeable building blocks, e.g., antenna (user terminal) modules and/or antenna (user terminal) elements.

FIG. 5A illustrates an antenna system comprising multiple antenna panels communicating with satellites at various different elevations, according to some embodiments. As shown, antenna (FPA) system 500 includes a main panel surrounded by four, angled side panels. Also shown are satellite 502, situated at an elevation of 90 degrees, satellite 504, situated at an elevation of 45 degrees, and satellite 506, situated at an elevation of 0 degrees.

In operation, antenna system 500 communicates with satellite 502, situated at elevation of 90 degrees, using primarily the main panel, with some portions of the four side panels also visible to the satellite and used for communication. FPA antenna system 500 communicates with satellite 504, situated at elevation of 45 degrees, using part of the main panel, as well as parts of two side panels, B and C, for communication. FPA antenna system 500 communicates with satellite 506, situated at 0 degrees using only side panel B, which is the only surface of antenna system 500 visible to satellite 506. Advantageously, satellite 500 is thus able to communicate with satellites at any elevation between 0 and 90, inclusive.

It should be noted that side panels A, B, C, and D, can be assembled from UTM modules that are identical to those of the main panel. Panels can be made to be different geometries to optimize for different applications, for example round vs. rectangular. In order to increase the area of the side panel(s), the height and/or width can be increased.

FIG. 5B illustrates several flat panel array antennas, according to some embodiments. Illustrated are several fixed-geometry flat panel array (FPA) antennas tent 552, flat-topped pyramid 554, triangular pyramid 556, triangular pyramid with side panels 558, geodesic dome 560, and blended splines 562. With the exception of 552, all of these fixed-geometry FPA antennas are capable of establishing a connection with satellites at any azimuth and any elevation. With the exception of tent 552, none of the fixed-geometry FPA antennas have any moving part, which reduces opportunities for failure.

Also illustrated are mechanically assisted FPA antennas tilting panel 564, flat-topped pyramid with moveable wings 566, octagonal main panel with eight foldable wings 568, and main panel with reflectors 570, shown at 572 in a side view. In operation, actuator 1 and actuator 2 cause tilting panel 564 to pivot about a pivot point along an x-axis and y-axis, allowing the antenna system to face a satellite for all elevation angles. Flat-topped pyramid 566 includes four actuators (not shown) that cause any of the four wings, wing A, wing B, wing C, and wing D, to move so as to attempt to assume a position in an arbitrary plane perpendicular to the line of sight to a satellite. Octagonal pyramid with moveable sides 568 also includes actuators (not shown) to move the sides so as to attempt to assume a position in an arbitrary plane perpendicular to the line of sight to a satellite.

Similarly, main panel with reflectors 570 includes four actuators (not shown) to move the reflectors so as to redirect the connection to the satellite to the main panel. Advantageously, all four mechanically assisted FPA antennas 564, 566, 568, and 570 are able to connect with a satellite at any azimuth and any elevation. In addition, 566 and 568 have the benefit of increased gain when the wings are folded to the main panel's level and where the signal combines from the main panel and the wings.

Figure 5C:
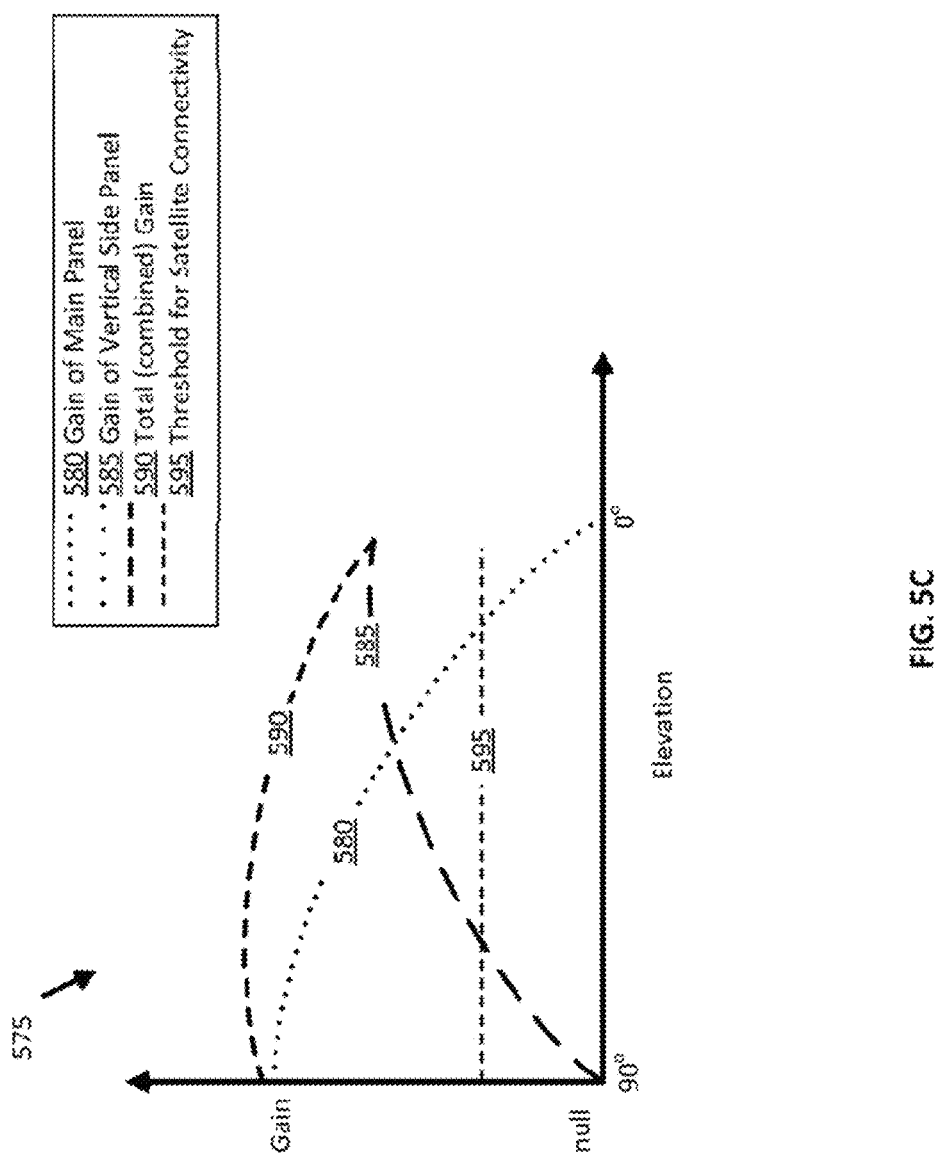
FIG. 5C is a graph illustrating the relative antenna gain contributions by the main panel, the side panels, as well as their combined total gain, as a function of satellite elevation.

FIG. 5C is a graph illustrating the relative antenna gain contributions by the main panel and the side panels as a function of satellite elevation. As shown, chart 575 scales antenna gain versus elevation angle. At an elevation of 90 degrees, the antenna gain is entirely attributable to the main panel gain 580. At an elevation of 0 degrees, the antenna gain is entirely attributable to the side panel(s) gain 585. At other elevations, both main panel gain 580 and side panel(s) gain 585 contribute to total gain 590.

Figure 8A:
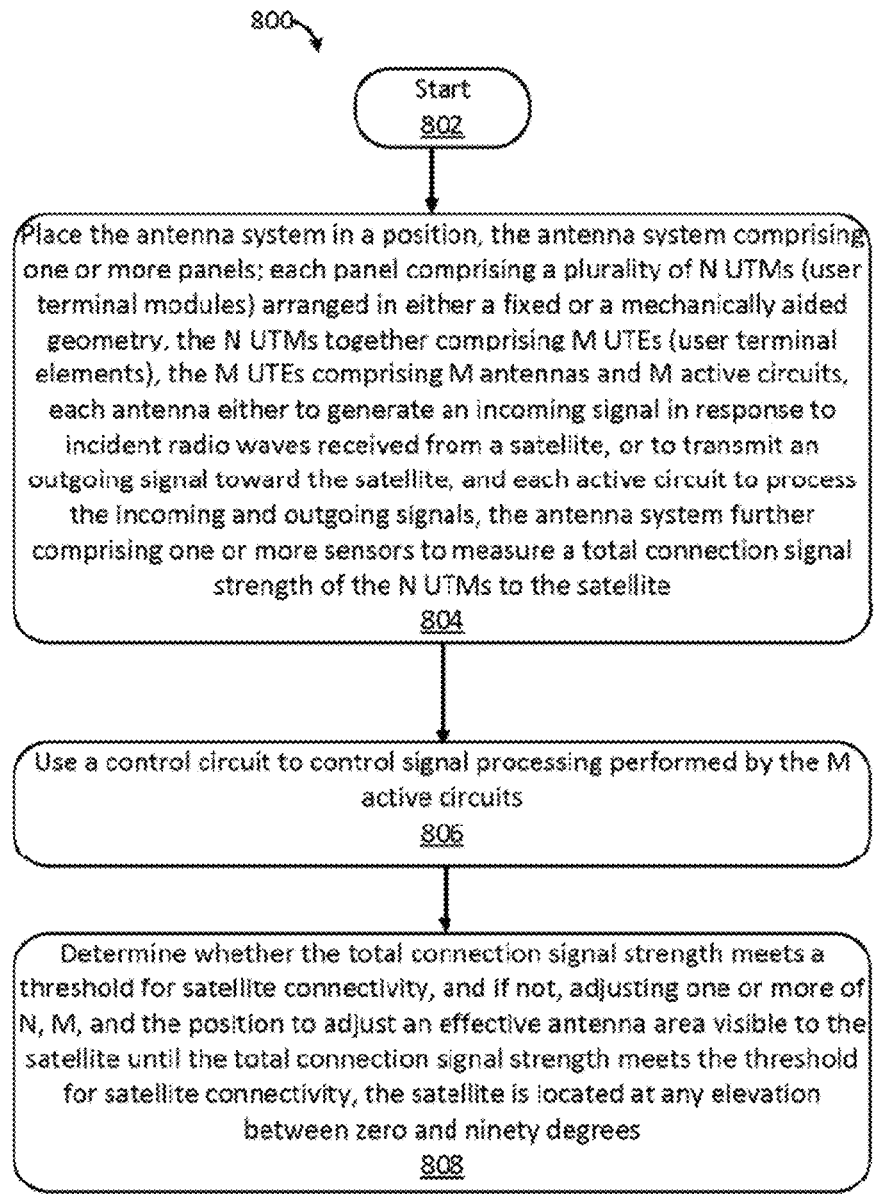
FIG. 8A illustrates a method of using an antenna system array to communicate with a satellite at any elevation, according to some embodiments.
Figure 8B:
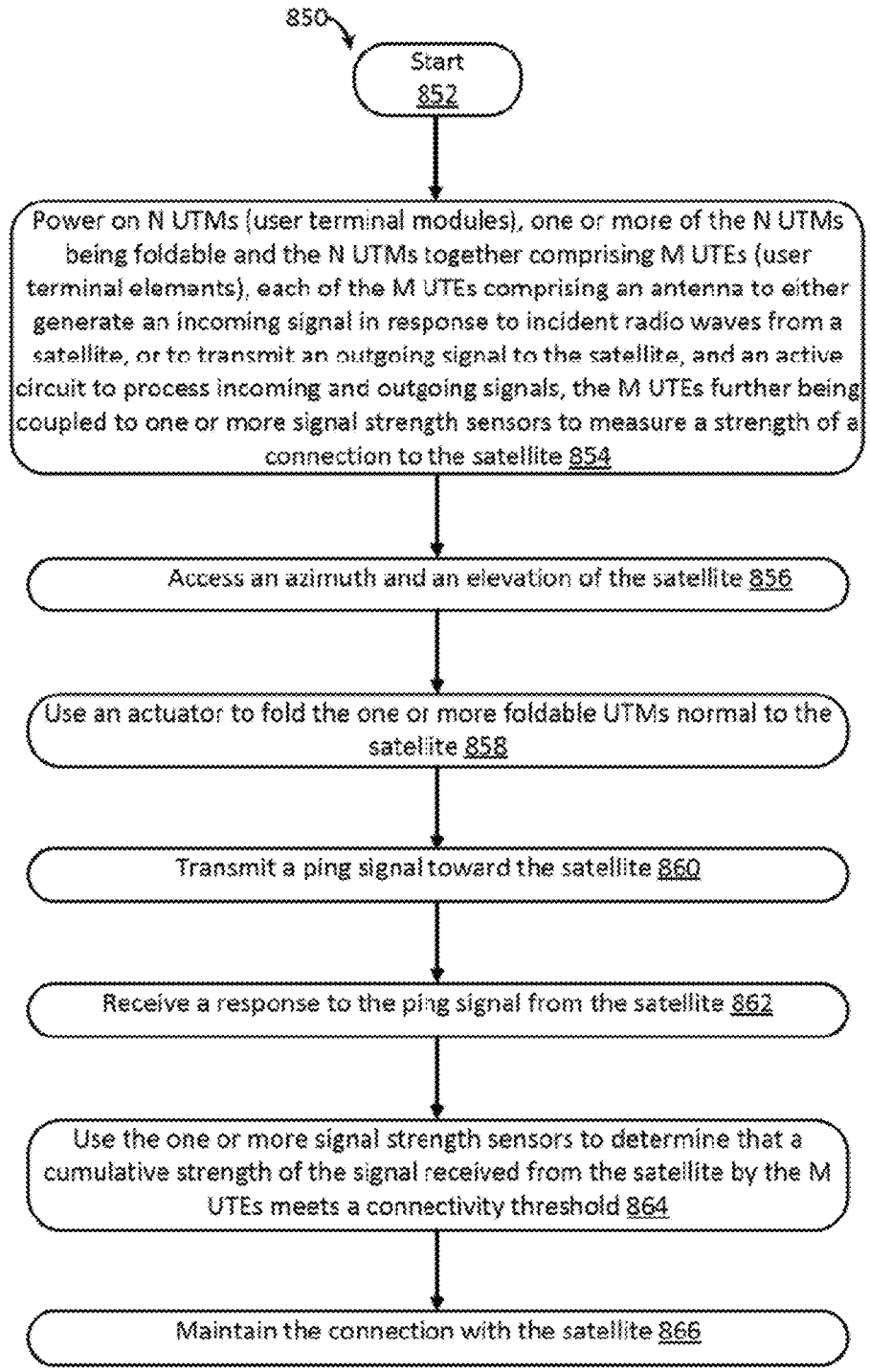
FIG. 8B illustrates a method performed by an antenna system array to connect with a satellite at any elevation, according to some embodiments.

Also shown is Threshold for Satellite Connectivity 595, which in some embodiments, such as the method illustrated in FIG. 8B, is used by an FPA antenna to determine whether a connection has been established with the satellite. If so, the connection can be maintained.

Further, Threshold for Satellite Connectivity 595 in some embodiments is used by an FPA antenna to determine whether it is worthwhile to continue using a UTE to communicate with a satellite. If not, it may not be worth expending the power required to continue operating the UTE. If the signal strength of the satellite communication is below the Threshold for Satellite Connectivity 595, then the UTE can be powered down to conserve power. It should be understood that the antenna gain is directly proportional to the effective antenna area visible to the satellite. In some embodiments, the main panel provides sufficient gain and only the main panel is powered on and used, allowing one or more side panels to be powered off. In some embodiments, when the satellite is at a low elevation, only one or more side panels are used, allowing the main panel to be powered off to conserve power.

FIG. 6 illustrates several embodiments of effective antenna areas of flat panel array antennas. Illustrated are triangular panel with sides flat panel array antenna 602, which has an effective antenna area 604, hexagonal panel with sides FPA antenna 606 has a hexagonal effective antenna area 608, and octagonal panel with sides FPA antenna 610 has an octagonal effective antenna area 612. In operation, each of the effective antenna area can be calculated as a sum of projected surfaces of each of the N UTMs as visible to the satellite, each projected area including a rectilinear projection of a UTM surface onto an arbitrary plane perpendicular to a line of sight to the satellite. Here, for simplicity, each of the satellites is shown at an elevation of 90 degrees, which is directly above the FPA antennas. Therefore, no part of the sides of the FPA antennas are visible to the satellite, and the effective antenna area is basically just equal to the surface area of the FPA antennas' main panels.

Figure 7:
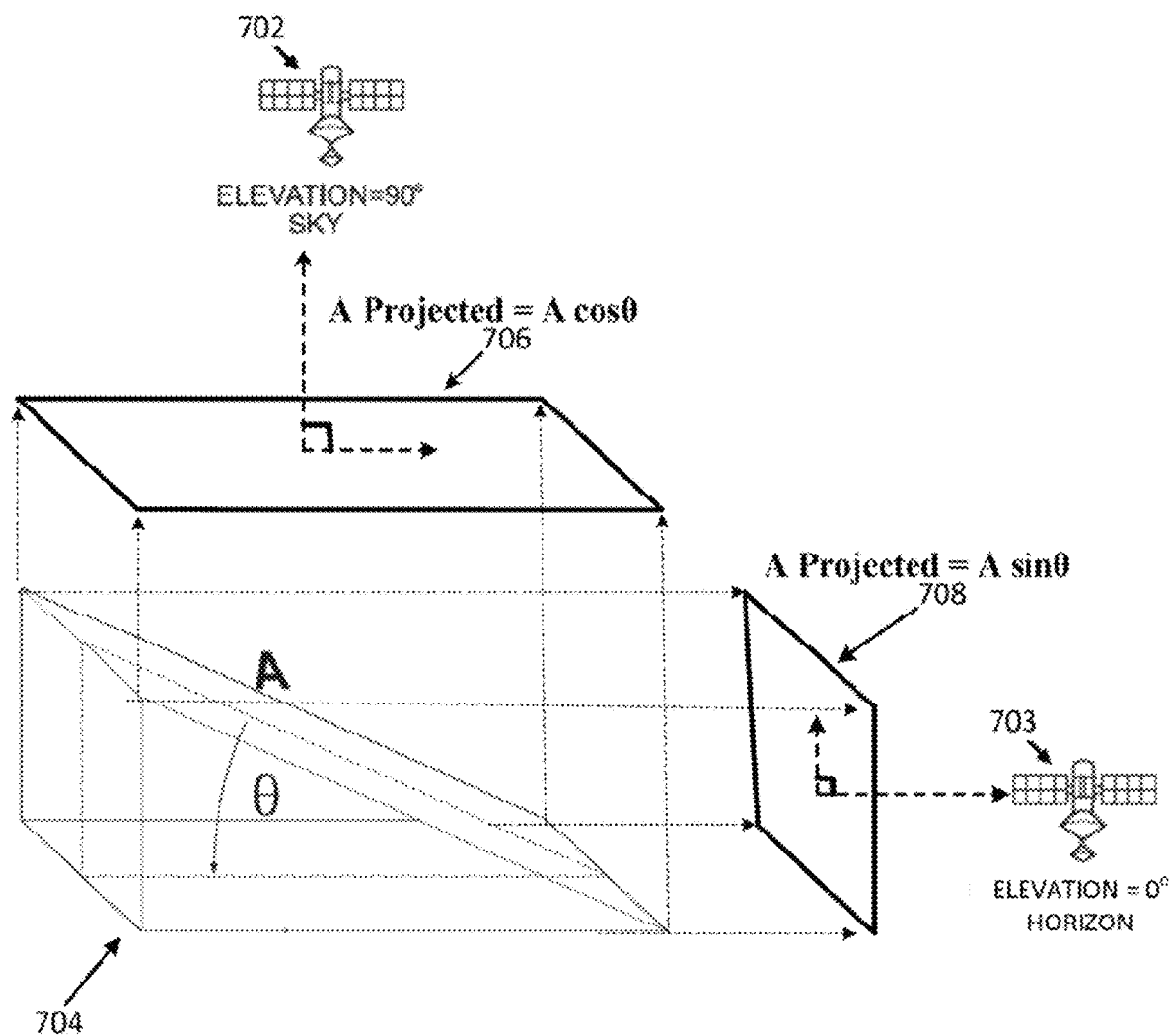
FIG. 7 illustrates an example of how to derive a projected area as seen by the satellite.

FIG. 7 illustrates an example of how to derive a projected area. The scenario illustrated in FIG. 6 is a simple calculation because the satellite is directly above the FPA antenna. If the satellite were at a different elevation, for example 45 degrees, or if the FPA antenna surface were at an angle, the effective antenna area would be less than the total surface area of the FPA antenna panel(s). In contrast, FPA antenna 704 is a tilted panel antenna, with its top tilted at an angle of Theta. Here, satellite 702 is directly above FPA antenna 704, but the effective antenna area 706 visible to satellite 702 is the actual surface area of the top panel multiplied by cos (Theta). Satellite 703, on the other hand, is at an elevation of 0 degrees, the horizon. The effective antenna area 708 visible to satellite 703 would be less than the total surface area of the FPA antenna main panel and would equal the area of the top panel multiplied by sin (Theta).

FIG. 8A illustrates a method of using an antenna system to communicate with a satellite at any elevation, according to some embodiments. As shown, process 800 begins at 802. At operation 804, the process calls for placing the antenna system in a position, the antenna system comprising one or more panels; each panel comprising a plurality of N UTMs arranged in either a fixed or a mechanically aided geometry, the N UTMs together comprising M UTEs, the M UTEs comprising M antennas and M active circuits, each antenna either to generate an incoming signal in response to incident radio waves received from a satellite, or to transmit an outgoing signal toward the satellite, and each active circuit to process the incoming and outgoing signals, the antenna system further comprising one or more sensors to measure a total connection signal strength of the N UTMs to the satellite. At operation 806, the process calls for using a control circuit to control signal processing performed by the M active circuits. A operation 808, the process calls for determining whether the total connection signal strength meets a threshold for satellite connectivity, and if not, adjusting one or more of N, M, and the position to adjust an effective antenna area visible to the satellite until the total connection signal strength meets the threshold for satellite connectivity, the satellite is located at any elevation between zero and ninety degrees. Though not shown, in some embodiments the FPA antenna is to transmit a ping signal toward the satellite, then the FPA antenna is to receive a response to the ping signal from the satellite.

In some embodiments, when the total connection signal strength is not sufficient for satellite connectivity, the method calls for adjusting one or more of N, M, and the position to adjust an effective antenna area visible to the satellite until the signal strength meets the requirement; and wherein the satellite is located at any elevation between zero and ninety degrees.

FIG. 8B illustrates a method performed by an FPA to connect with a satellite at any elevation, according to some embodiments. As shown, a flat panel array (FPA) antenna is to perform method 850, starting at 852. At operation 854, the FPA antenna is to power on N UTMs, one or more of the N UTMs being foldable and the N UTMs together comprising M UTEs, each of the M UTEs comprising an antenna to either generate an incoming signal in response to incident radio waves from a satellite, or to transmit an outgoing signal to the satellite, and an active circuit to process incoming and outgoing signals, the M UTEs further being coupled to one or more signal strength sensors to measure a strength of a connection to the satellite. At operation 856, the FPA antenna is to access an azimuth and an elevation of the satellite. At operation 858, the FPA antenna is to use an actuator to fold the one or more foldable UTMs normal to the satellite. At operation 860, the FPA antenna is to transmit a ping signal toward the satellite. At operation 862, the FPA antenna is to receive a response to the ping signal from the satellite. At operation 864, the FPA antenna is to use the one or more signal strength sensors to determine that a cumulative strength of the signal received from the satellite by the M UTEs meets a connectivity threshold. At operation 866, the FPA antenna is to maintain the connection with the satellite.

Figure 9:
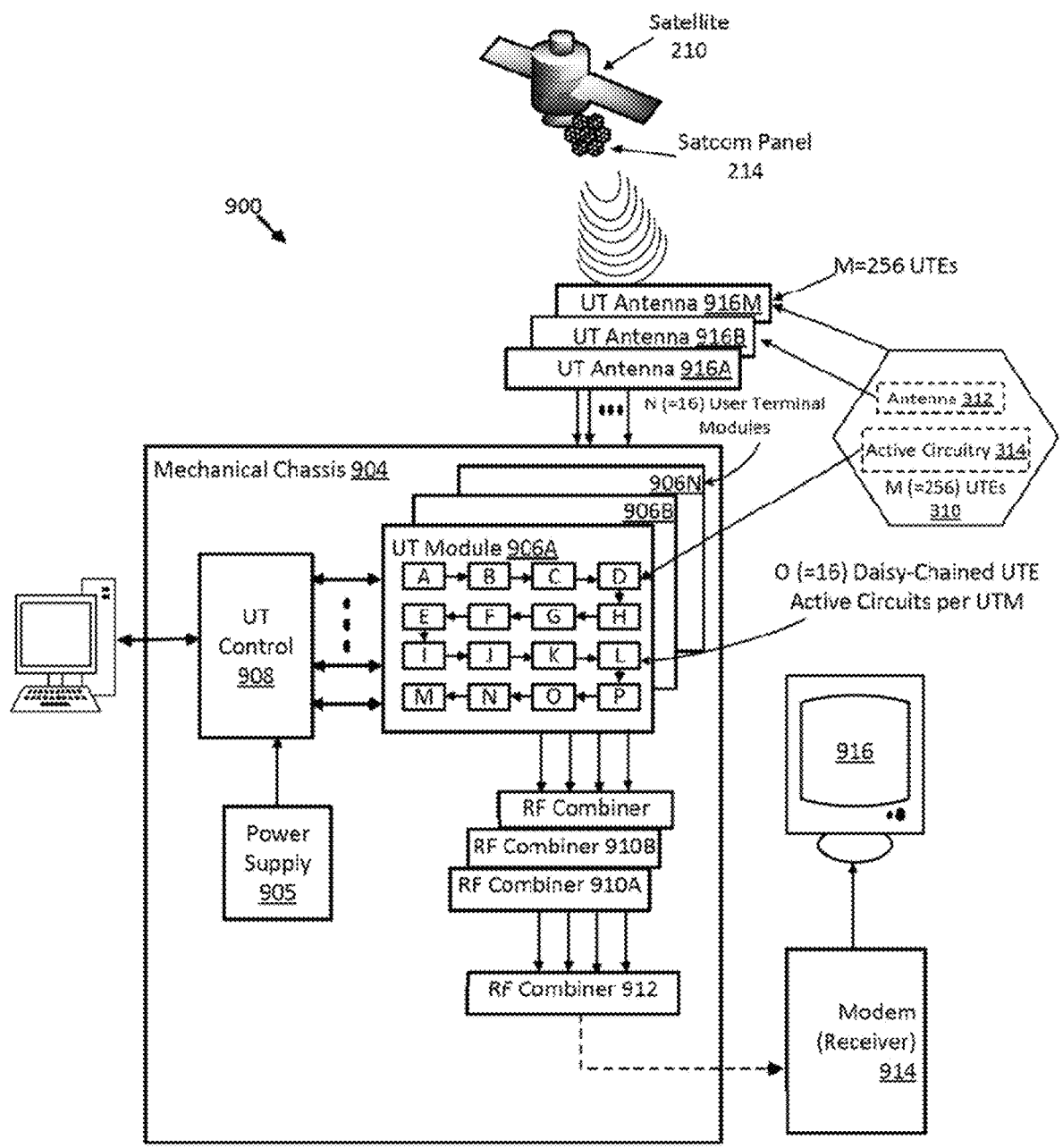
FIG. 9 depicts a block diagram illustrating an example system (beam-scanning antenna) to transmit and receive satellite radio wave signals for an application, according to some implementations.

FIG. 9 depicts a block diagram illustrating an example system (beam-scanning antenna) to transmit and receive satellite radio wave signals for an application, according to some implementations. As shown, satellite antenna system 900 includes a mechanical chassis 904, which contains user terminal (UT) modules 906A, 906B, up to 906N, with N equal to 16. Each of the UT modules includes sixteen daisy chained UTEs, which are each examples of UTE 310, and which each contain an antenna 312 and active circuitry 314. In other embodiments, for example as shown in FIG. 11B and FIG. 11C, more than sixteen UTEs are daisy chained. The processing performed by the active circuits of the UTEs is controlled by UT control 908.

As shown, the sixteen UTMs provide sixteen analog signals to a first level of RF combiners 910A, 910B, up to 910X, with X equal to 4, since each combiner receives signals from four UTMs. A second combinatorial level, RF combiner 912, combines the signals from the first level. It should be noted that in other embodiments, there can be more or fewer combiners. It also should be noted that the number of levels of combiners can vary. In other words, while two levels of combiners are shown in FIG. 9, in other embodiments, there can be more or fewer levels.

Also shown are UT antennas 916A, 916B, up to 916M. Here, M equals 256, N equals 16, and O, the number of UTEs per UTM, equals 16.

In operation, satellite antenna system 900 provides satellite communications for a personal computer application. In doing so, satellite antenna system 900 communicates with satellite 210, which is shown including a satcom panel 214.

In some embodiments, each of the M antennas of the M UTEs is tuned to one or more of a plurality of different frequency ranges. In some embodiments, each of the antennas on each of the UT modules is identical. As shown, the incoming signal received from the antenna of each UTE is an analog voltage, and each of the M active circuits receives, processes, and produces an output signal having an analog voltage, and each of the N UTMs produces an analog signal that is combined with analog signals from other UTMs. Received radio wave signals are delivered from RF combiner 912 to modem (Receiver) 914 which provides them to device 916, such as a TV or an internet receiver.

Some embodiments reduce costs and area required for routing by passing digital control signals along a daisy-chain of active circuits, rather than to route control signals from control circuitry to each of the active circuits. In particular, in some embodiments, digital control signals, clocks, and power are passed between modules using input and output buffers, such as buffers 1010 and 1012 of FIG. 10. In such a scenario, system costs can be further reduced by exploiting the daisy-chain concept to use just one controller circuit to control multiple active circuits in the daisy-chain.

In some such scenarios the daisy-chain passes digital control signals, power, and clock signals; the analog processing is performed by combiners, such as combiner 910A-N and 912 FIG. 9. In some embodiments, a signal from each of the UTMs is to return to the controller via the daisy chain, the controller to monitor the signal to gauge health of the system.

Figure 10:
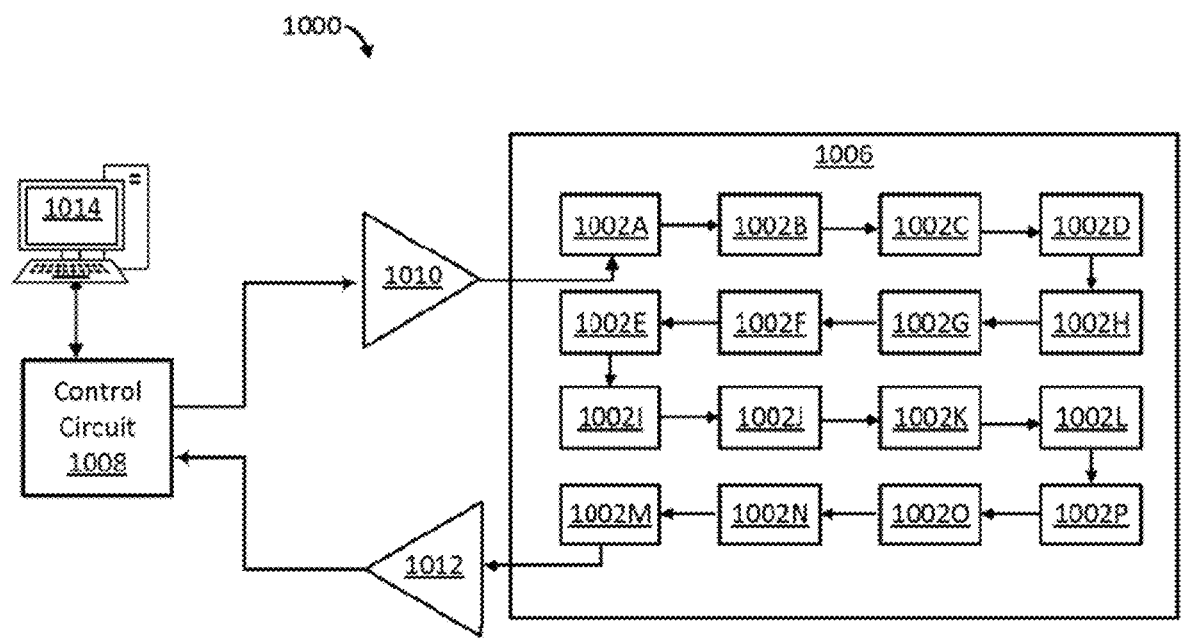
FIG. 10 depicts a block diagram illustrating an example user terminal module, user terminal control module, and amplitude adjustment buffers, according to some implementations.

FIG. 10 depicts a block diagram illustrating an example user terminal module, user terminal control module, and amplitude adjustment buffers, according to some implementations. As shown, system 1000 is an example of UT control 908 and one of the UTMs 906A-906N of FIG. 9. Here, UTM 1006 includes sixteen UTEs 1002A-1002P. UTM 1006 is configured to receive an incoming signal from buffer 1010, feed the signal to be processed through a daisy-chain of UTEs, and provide an outgoing signal through buffer 1012. Buffers 1010 and 1012 are connected to controller board 1008, which services another electronic device, such as a personal computer 1014 application, modem board, network adapter, etc. In some embodiments, controller board 1008 monitors the health of the system by monitoring one or more signal characteristics of the signal received from buffer 1012.

Figure 11A:
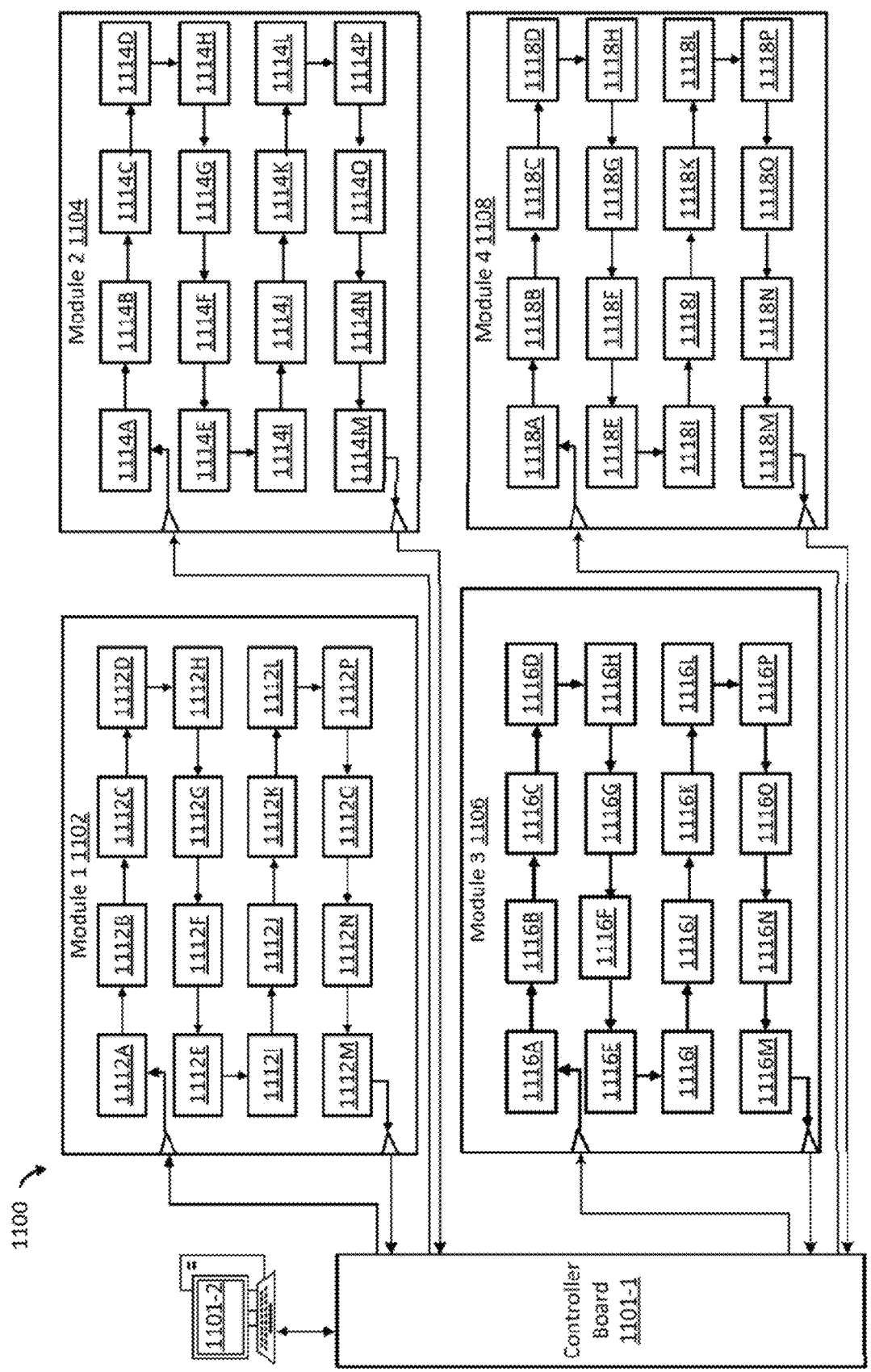
FIG. 11A depicts a block diagram illustrating an example of multiple user terminal modules and a user terminal control module, according to some implementations.
Figure 11B:
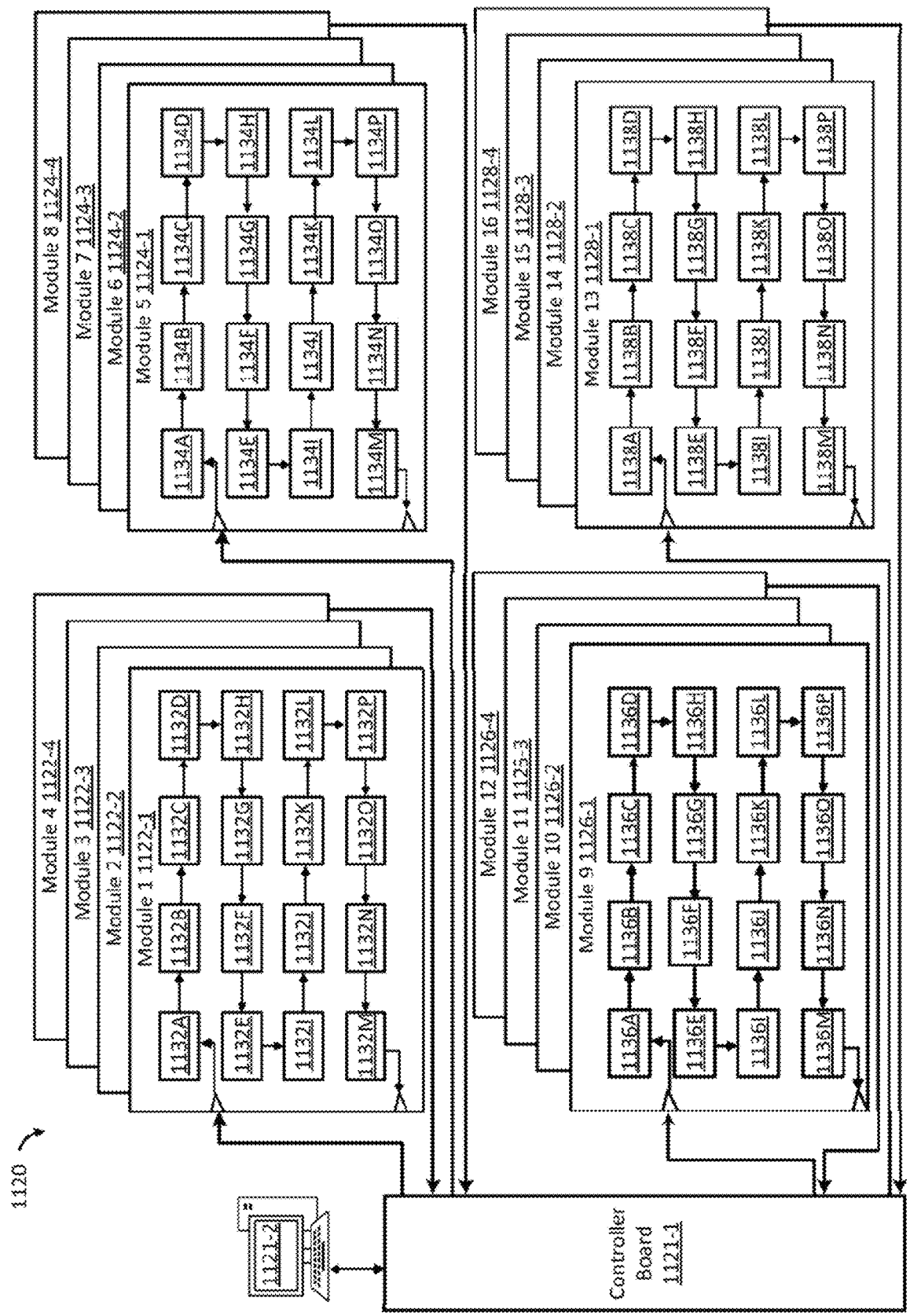
FIG. 11B depicts a block diagram illustrating an example of multiple user terminal modules and a user terminal control module, according to some implementations.
Figure 11C:
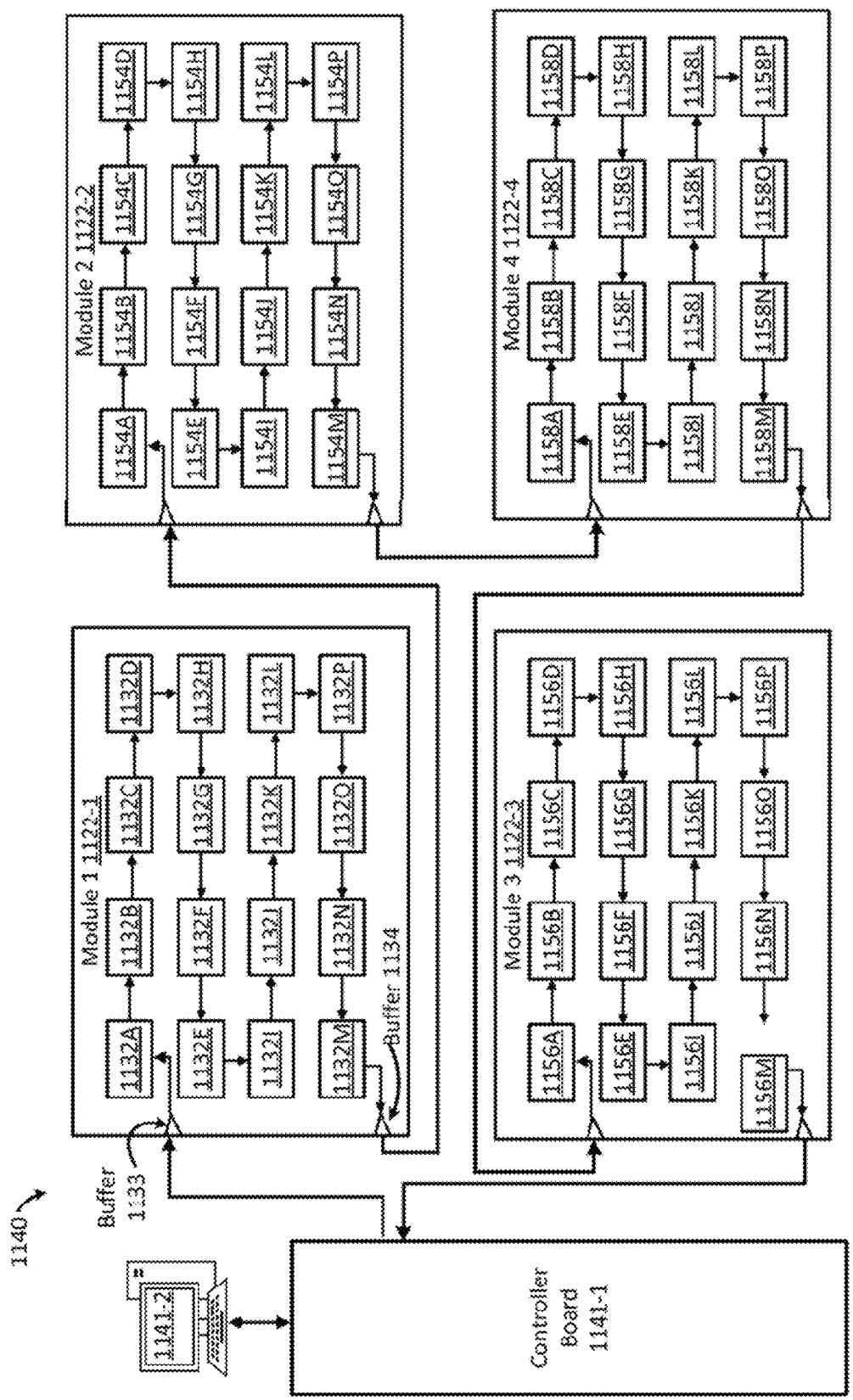
FIG. 11C depicts a block diagram illustrating an example of multiple user terminal modules and a user terminal control module, according to some implementations.

FIGS. 11A-11C depict block diagrams illustrating user terminal modules interconnected in various configurations, according to some implementations. It should be noted that antennas for use in disclosed antenna systems can be selected according to various criteria, including a target frequency range, a target polarization, and a target beam direction. For example, as mentioned above, antennas can be selected that are tuned to a particular frequency range, such as the Ku-Ka frequency band. Further, antennas can be selected according to a polarization of received signals, be it horizontal, vertical, left-hand circular, or right-hand circular polarization. Furthermore, antennas can be selected based on a beam direction to which they are tuned. According to these criteria, some implementations select a module having identical antennas. Other embodiments partition the UTEs on a UTM into two or more groups, the antennas within each group having the same characteristics. User terminal elements (UTEs) can be selected according to the frequency, polarization, and beam direction to which they are tuned.

FIG. 11A depicts a block diagram illustrating an example of multiple user terminal modules and a user terminal control module, according to some implementations. Here, antenna system 1100 includes four UTMs 1102, 1104, 1106, AND 1108, each of which contains a daisy-chain of sixteen UTEs on the respective modules. UTM 1102 includes a daisy chain of UTEs 1112A-1112P. UTM 1104 includes a daisy chain of UTEs 1114A-1114P. UTM 1106 includes a daisy chain of UTEs 1116A-1116P. UTM 1108 includes a daisy chain of UTEs 1118A-1118P. Here, each of the four UTMs (1102, 1104, 1106, and 1108) has a separate connection to controller board 1101-1, which services a personal computer 1101-2 application.

FIG. 11B depicts a block diagram illustrating an example of multiple user terminal modules and a user terminal control module, according to some implementations. Here, antenna system 1120 includes sixteen UTMs, grouped into four groups of UTMs 1122-1-4, 1124-1-4, 1126-1-4, and 1128-1-4. Each of the four groups of UTMs includes a daisy-chain of 64 UTEs spanning across the stack. For example, the first group includes daisy-chained modules 1122-1, 1122-2, 1122-3, and 1122-4. UTM 1122-1 includes 16 UTEs 1132A-1132P. UTMs 1122-2, 1122-3, and 1122-4 also each include 16 UTEs, which are not shown here. FIG. 11C, however, shows all four UTMs, 1122-1, 1122-2, 1122-3, and 1122-4, as well as the 16 UTEs included on each UTM. The output of UTM 1122-1 is connected to the input of UTM 1122-2, and, ultimately, the output of UTM 1122-4 is connected back to controller board 1121-1, which connects to computer 1121-2. Similarly, UTM 1124-1 is shown including UTEs 1134A-1134P, UTM 1126-1 is shown including UTEs 1136A-1136P, and UTM 1128-1 is shown including UTEs 1138A-1138P. While the modules 1122-1-4, 1124-1-4, 1126-1-4, and 1128-1-4, are depicted in FIG. 11B in a stacked configuration, it should be understood that in use the modules could be arranged in a non-overlapping manner such that the UTEs may receive and transmit signals, and would not be occluded by another module.

As with the system of FIG. 11A, the UTMs stacks here have four connections to controller board 1121-1. In contrast to the system of FIG. 11A, the daisy-chains here consist of 64 UTEs. By daisy-chaining four stacks of UTMs together, four times as many UTEs can be controlled by controller board 1121-1, thus reducing the per-UTE costs of the system. According to disclosed embodiments, any number of UTMs may be serially daisy chained. Additional UTMs can be inserted into the daisy-chain, thereby scaling the system 1120.

FIG. 11C is a block diagram illustrating the stack of UTMs 1122-1 through 1122-4 of FIG. 11B. As shown, controller board 1141-1 is coupled to provide an input to a first UTM 1122-1 of four stacked UTMs, and to receive an output from a fourth UTM 1122-4 of the four stacked UTMs. In such an embodiment, a daisy-chain of 64 active circuits performs the signal processing, and controls can be routed along that daisy-chain. Also shown is UTM 1122-2, which includes 16 UTEs and continues the daisy chain by receiving the output of UTM 1122-1. Also shown is UTM 1122-3, which includes 16 UTEs and continues the daisy chain by receiving the output of UTM 1122-2. Also shown is UTM 1122-4, which includes 16 UTEs and continues the daisy chain by receiving the output of UTM 1122-3. UTM 1122-4 completes the daisy chain of 64 UTEs by returning its output to controller board 1141-1.

Figure 12:
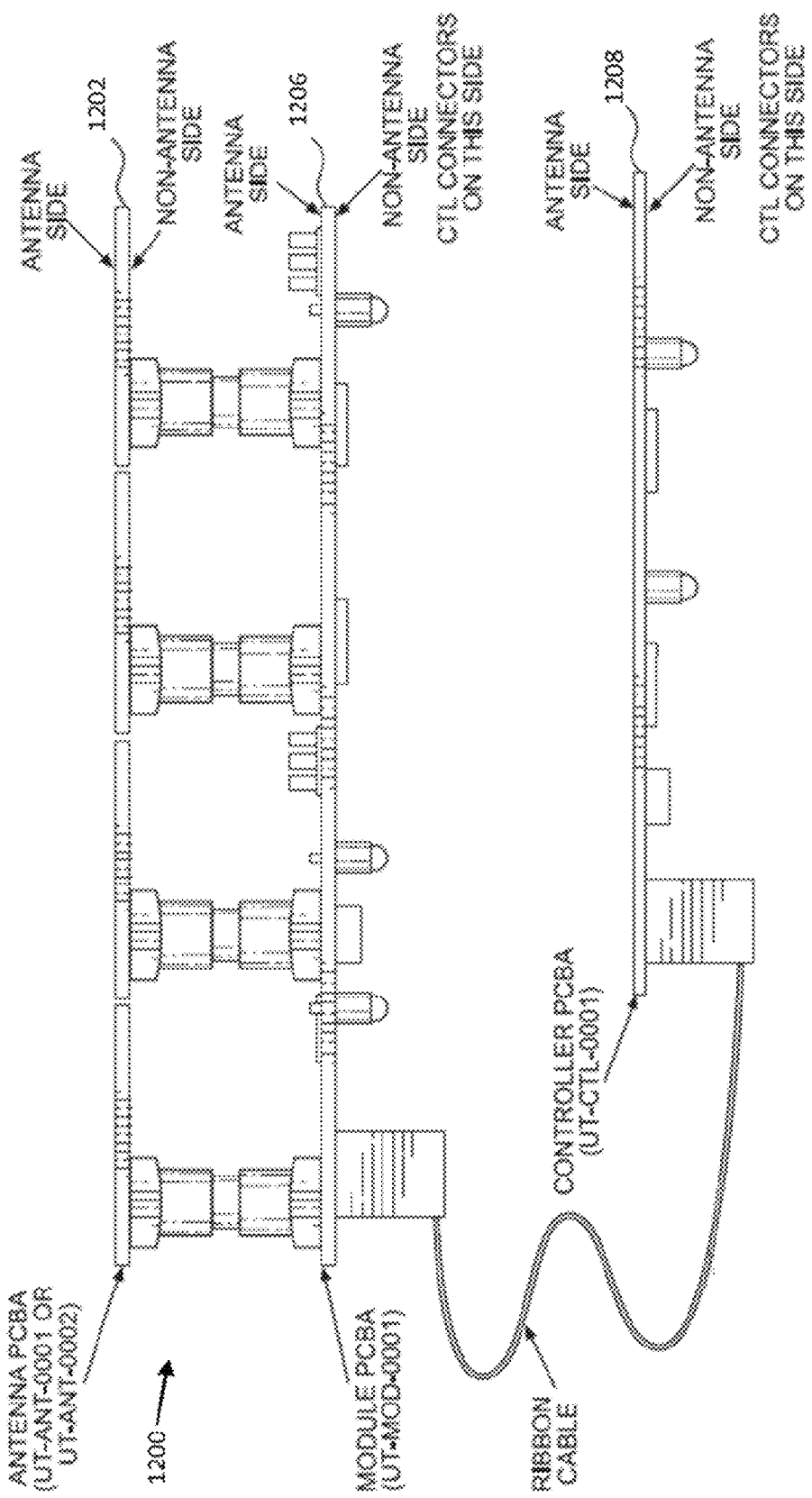
FIG. 12 depicts cross-sectional views of an antenna board mounted onto a module board that is connected to a controller board, for use in a beam-scanning antenna, according to some implementations.

FIG. 12 depicts a cross-sectional view of an antenna printed circuit board mounted atop a module printed circuit board that is connected to a controller board for use in a beam-scanning antenna, according to some implementations. As shown, cross-sectional view 1200 includes antenna PCB 1202, module PCB 1206, and control PCB 1208. Together, the UT antenna elements are placed on antenna PCB 1202. Likewise, the active circuit elements are placed on module PCB 1206, as controlled by control circuitry on control PCB 1208 are configured to perform operations as described herein, including, for example, as described with respect to FIG. 8.

Figure 13:
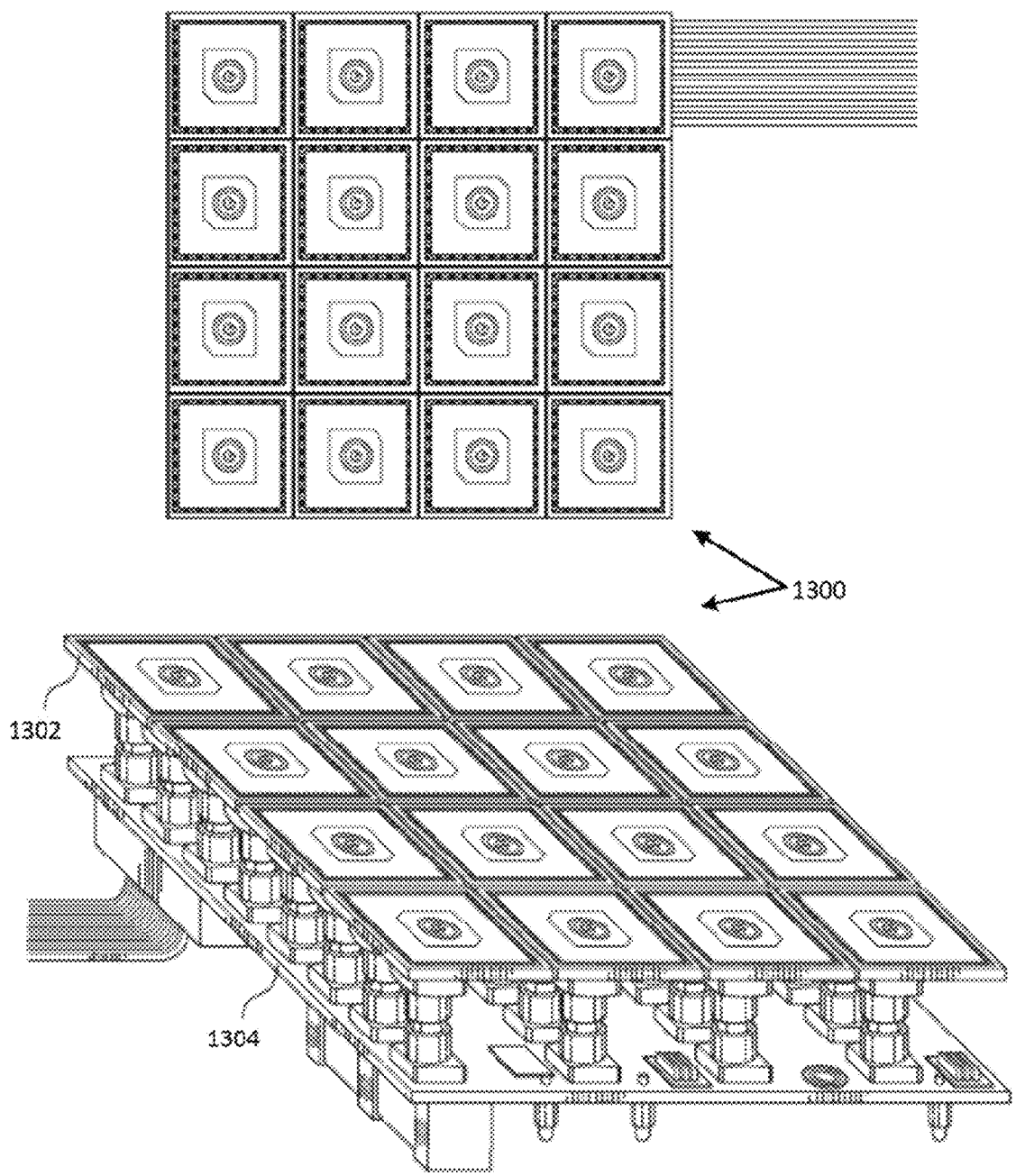
FIG. 13 depicts plan and perspective views of an antenna board mounted onto a module board for use in a beam-scanning antenna, according to some implementations.

FIG. 13 depicts plan and perspective views of an antenna board mounted onto a module board for use in a beam-scanning antenna, according to some implementations. Assembly 1300 is shown in both plan view, in which antenna board 1302 is visible, and in perspective view, in which both antenna board 1302 and module board 1306 are visible.

Figure 14:
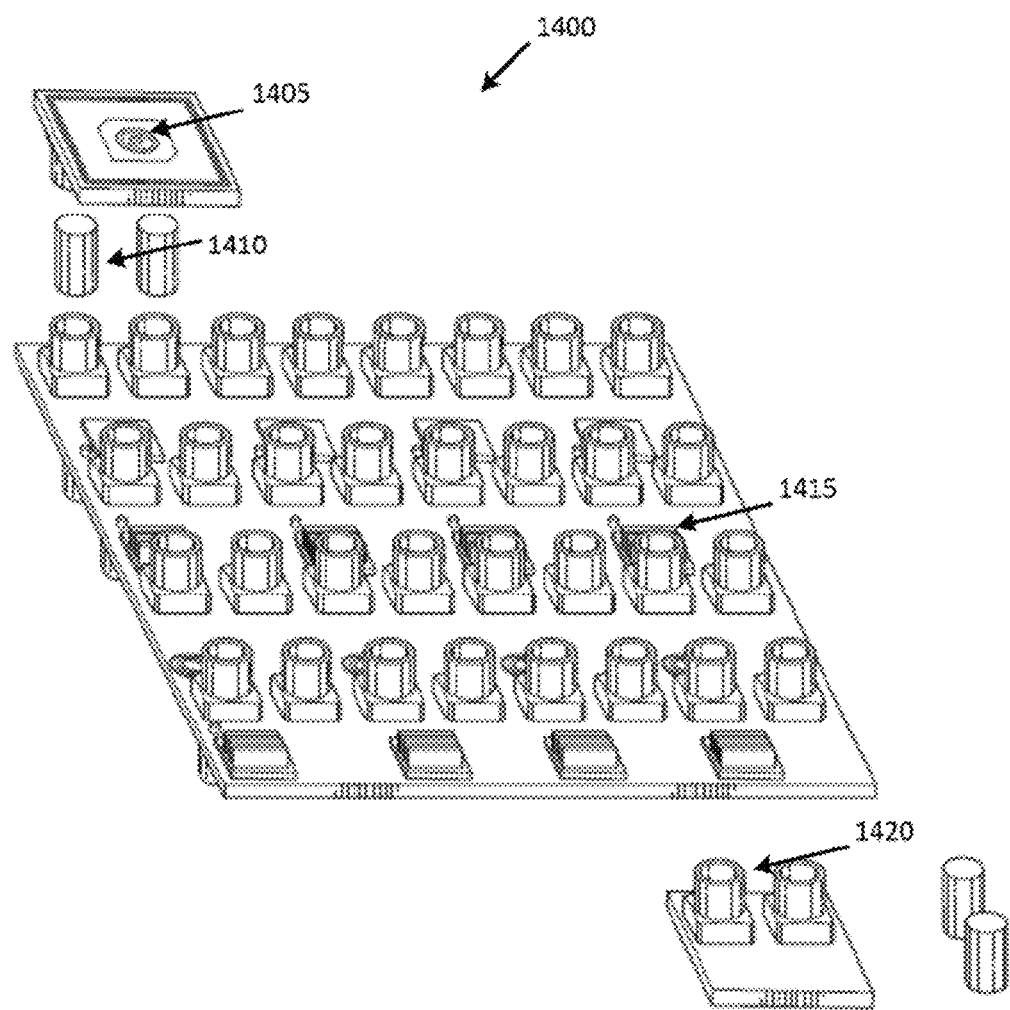
FIG. 14 illustrates several standard components and connectors used to assemble a beam-scanning array system, according to some embodiments.

FIG. 14 illustrates several standard components and connectors used to assemble a beam-scanning array system, according to some embodiments. As shown, components 1400 include an antenna element 1405, SMP connectors 1410, printed circuit board 1415, and connector 1420. Incidentally, the parts used to build a demonstration are believed to be attainable at minimal expense.

Figure 15:
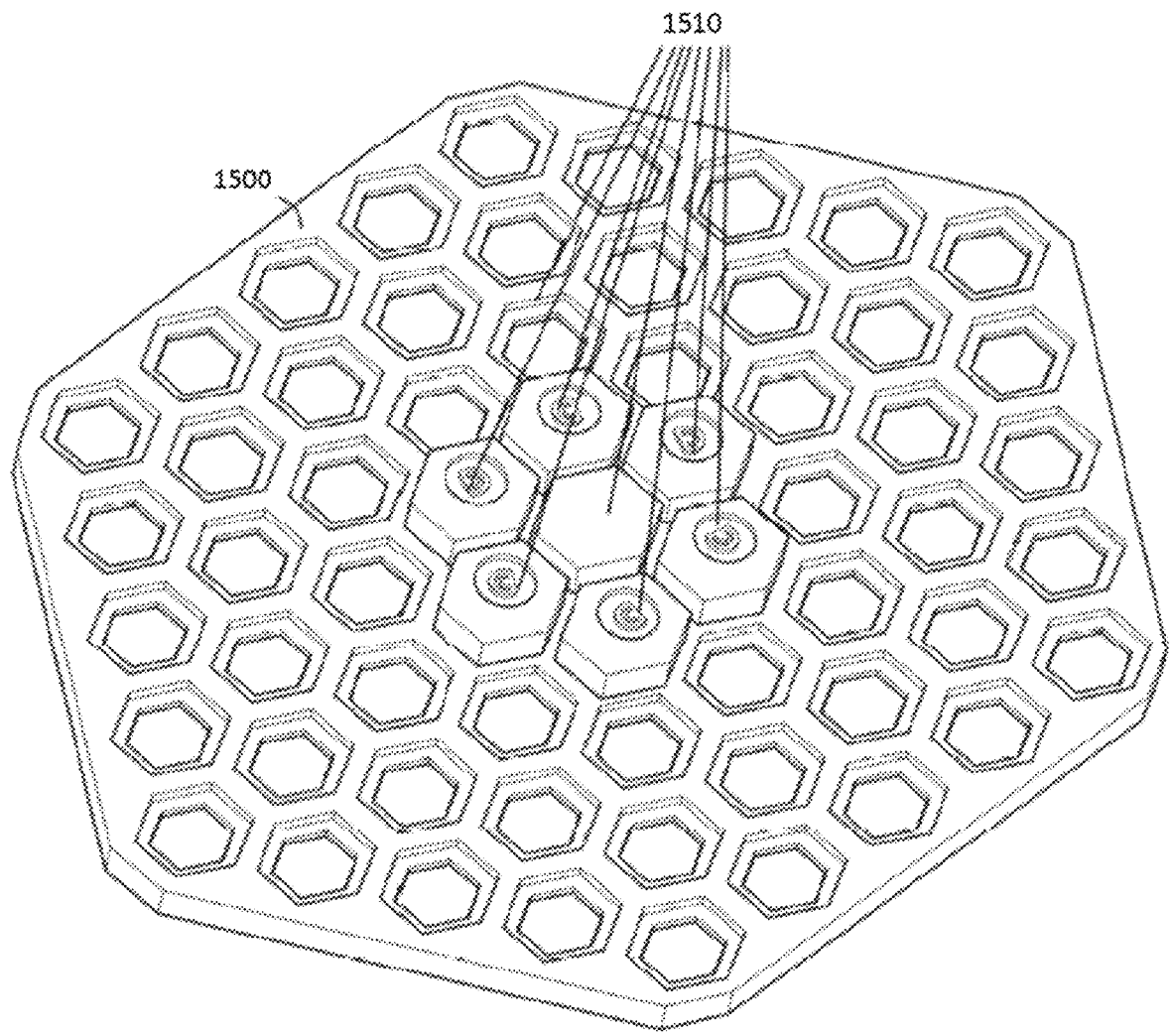
FIG. 15 depicts an example structure used to form an antenna (or user terminal) module, according to some implementations.

FIG. 15 depicts an example structure 1500 used to form an antenna (or user terminal) module, according to some implementations. More specifically, the example of FIG. 15 illustrates a structure populated with seven antenna (or user terminal) elements 1510. The example structure 1500 can be structure 320 of FIG. 3, although alternative configurations are possible. Although not shown in the example of FIG. 15, one or more of the example structures can be secured to a base board for constructing a high-performance scanned array antenna system.

Figure 16:
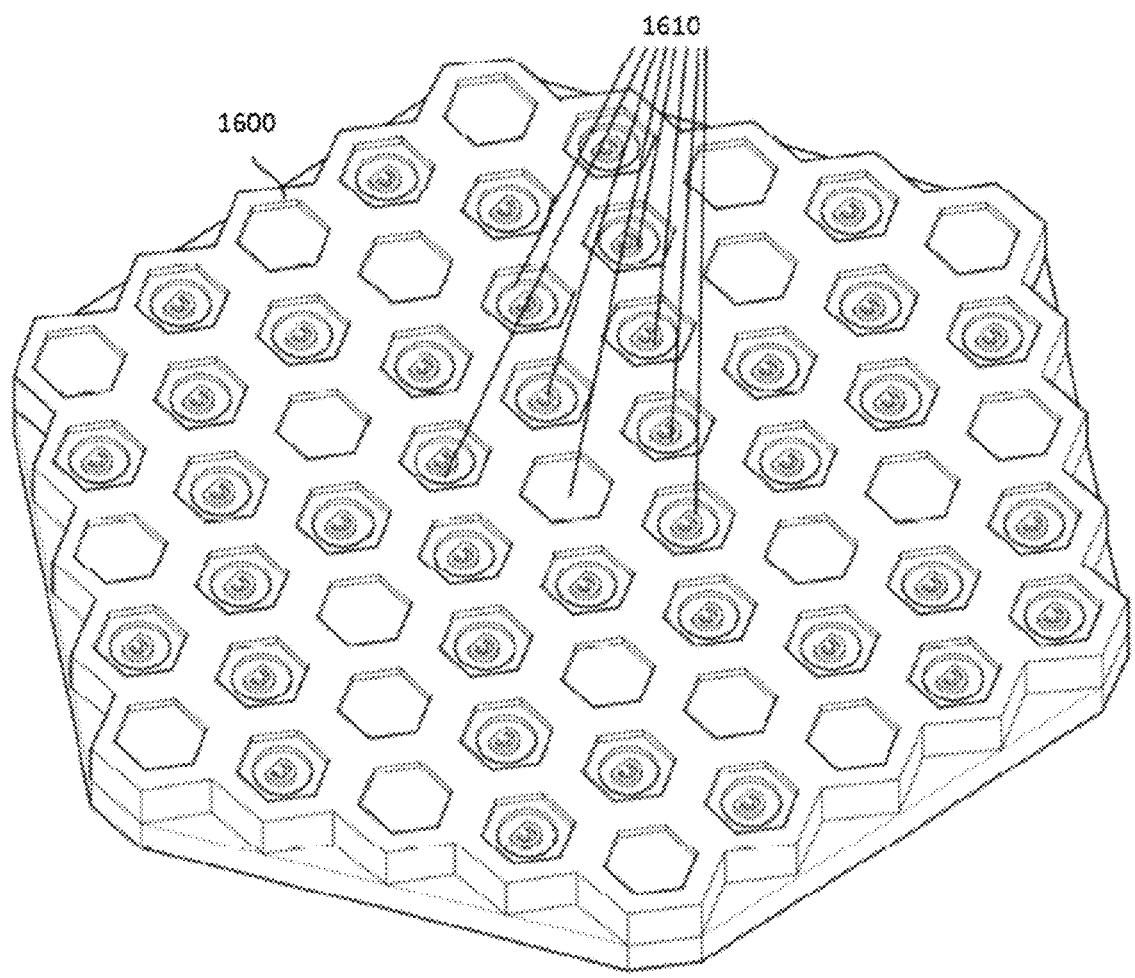
FIG. 16 depicts an example structure used to form an antenna (or user terminal) module, according to some implementations.

FIG. 16 depicts an example structure 1600 used to form an antenna (or user terminal) module, according to some implementations. The example structure 1600 is similar to example structure 1500 of FIG. 15 but is designed to hold the antenna more securely (or user terminal) elements 1618 in place. Additionally, as shown in the example of FIG. 16, example structure 1600 is fully populated with antenna (or user terminal) elements 1610.

Figure 17:
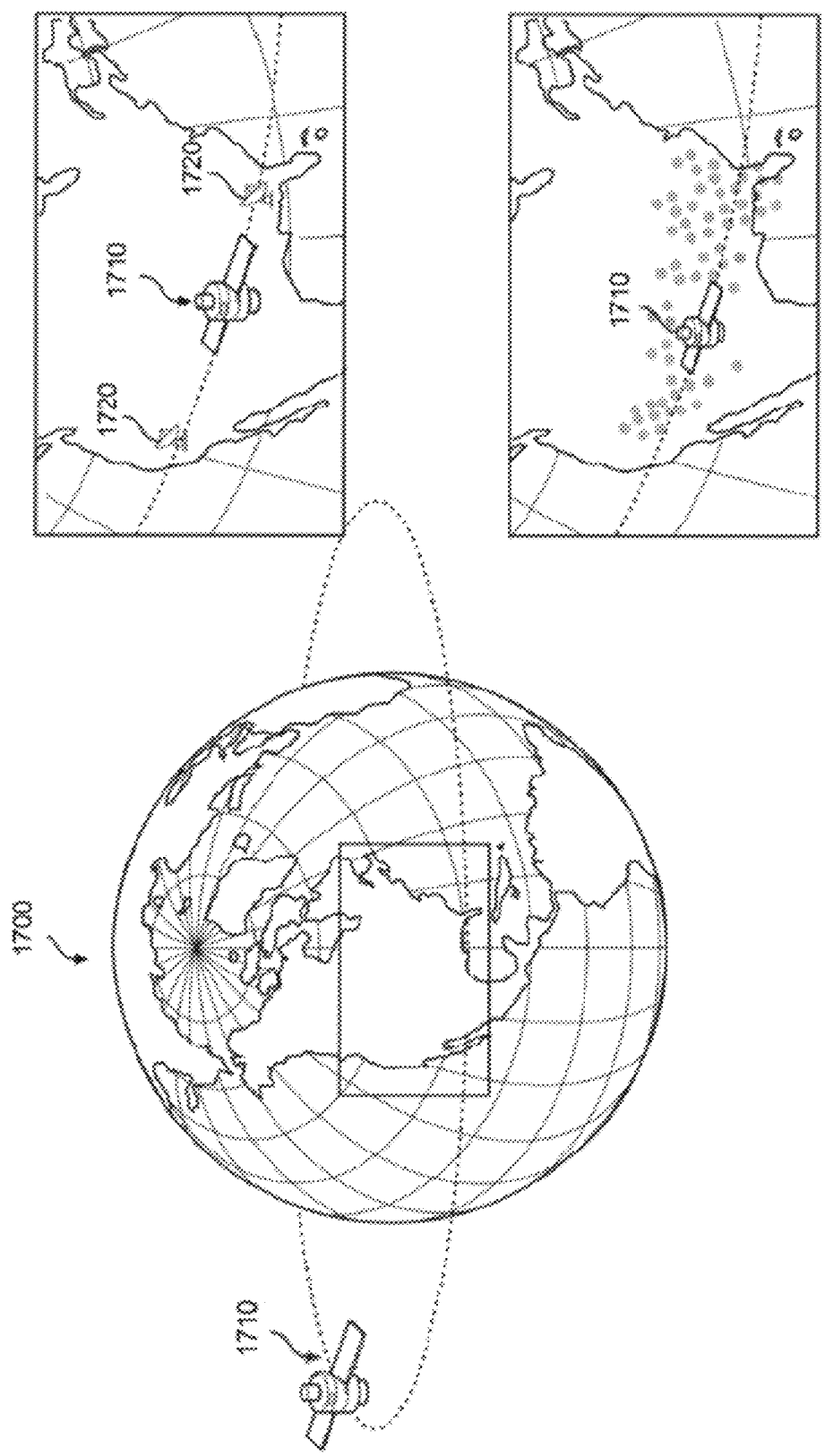
FIG. 17 depicts an example utilizing multiple ground user terminals constructed from modular satellite user terminal antenna systems to improve coverage and speed for real-time imaging applications, according to some implementations.

FIG. 17 depicts an example utilizing multiple ground user terminals constructed from modular satellite user terminal antenna systems to improve coverage and speed for real-time imaging applications, according to some implementations.

Today, imaging is primarily done through LEO constellations of satellites. However, the imaging coverage typically relies on how many satellites are included and the satellites need to wait for minutes to hours to cover different parts of the Earth. That is, satellite 1710 traverses a particular path over the Earth and needs to wait until communications can be established with a ground terminal 1720 (e.g., fixed-beam dish-based solution or gateway) before the capture image can be transmitted back to Earth. As discussed above, there are typically between one and five ground terminals 1720 along the particular path and therefore considerable latency exists in the imaging process.

As discussed herein, high quantities of low-cost, beam-forming, terminals can be utilized to replace the few, expensive, fixed-beam dish-based solutions to facilitate real-time or near real-time down of images.

Figure 18:
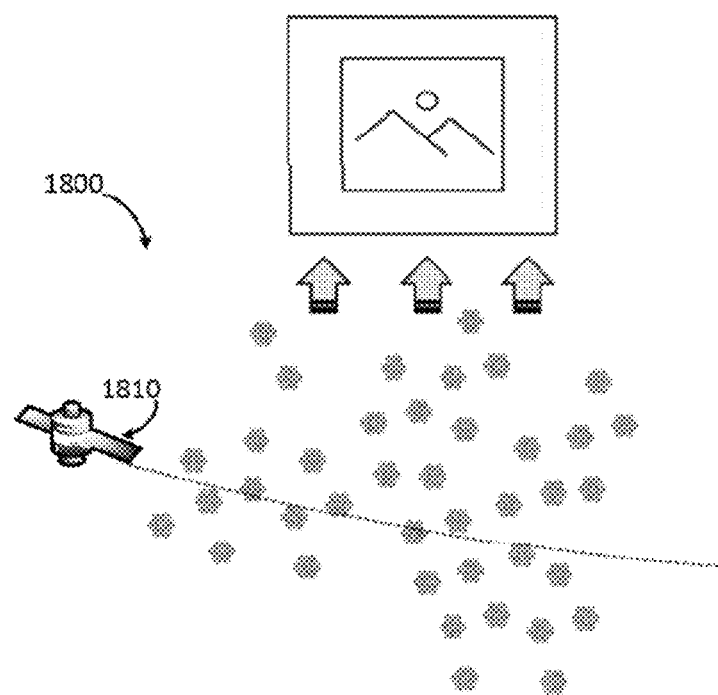
FIG. 18 depicts an example synthetic aperture ground user terminal constructed from multiple modular satellite user terminal antenna systems, according to some implementations.

FIG. 18 depicts an example synthetic aperture ground user terminal constructed from multiple modular satellite user terminal antenna systems, according to some implementations.

In order to obtain high-quality images, satellites need to have an extremely large antenna size. Satellites typically achieve this by performing synthetic aperture radar (SAR). For example, a small satellite captures images as it is moving and then reconsolidates the data as if it was a large aperture. The satellite then has a very large file and in order to receive it fast on the ground, an extremely large ground terminal (meters large) is needed. For example, large dishes that cost on the order of millions of dollars are often used for this purpose.

The example of FIG. 18 illustrates a synthetic aperture ground user terminal constructed from many user terminals, meters, or any arbitrary distance, apart that collectively receive and combine the data to effectively create a synthetically large ground terminal. Utilizing this architecture, gigabytes of data can be received in seconds and even live video streams of images taken by satellites are possible.

Figure 19:
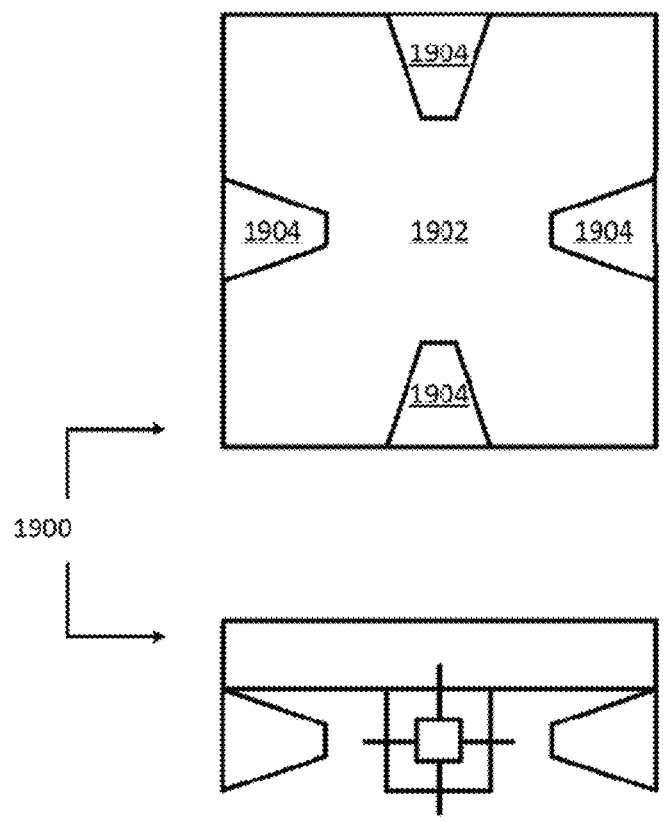
FIG. 19 depicts an example of ground a user terminal including horns, according to some implementations.

The example of FIG. 19 illustrates a ground user terminal constructed from modular satellite user terminal antenna systems 1902 with additional feed horns 1904 used to extend the range of elevation angles covered when compared to a single FPA. The feed horns enable receiving or transmitting signals at elevation angles the FPA cannot.

Alternatively, in some implementations, a single moving terminal (e.g., on a vehicle) can move around to create the synthetically large terminal.

Further Examples

The following examples describe various examples of configurations and embodiments of the disclosed invention, as described above.

Example 1 provides an exemplary antenna system comprising: P UTPs together comprising N UTMs arranged in either a fixed or a mechanically aided geometry, the N UTMs together comprising M UTEs, the M UTEs comprising M antennas and M active circuits, each antenna either to generate an incoming signal in response to incident radio waves received from a satellite, or to transmit an outgoing signal toward the satellite, and each active circuit to process the incoming and outgoing signals; and a control circuit to control signal processing performed by the M active circuits; and wherein N and M can be adjusted so that an effective antenna area visible to the satellite and a corresponding throughput of a connection thereto can be adjusted to maintain the connection, the satellite being located at any elevation between zero and ninety degrees, inclusive.

Example 2 includes the substance of the exemplary antenna system of Example 1, wherein the effective antenna area comprises a sum of projected surfaces of UTPs as visible to the satellite, each projected area comprising a rectilinear projection of an antenna panel surface onto an arbitrary plane perpendicular to a line of sight to the satellite.

Example 3 includes the substance of the exemplary antenna system of Example 1, wherein each UTE antenna is further to generate an incoming signal in response to incident radio waves received from a second satellite, or to transmit an outgoing signal toward the second satellite, and wherein N and M can be adjusted so that a second effective antenna area visible to the second satellite and a corresponding throughput of a second connection to the second satellite are adjustable and scalable to maintain the second connection, the second satellite being located at any elevation between zero and ninety degrees, and wherein the Antenna system maintains a multi-beam connection with both the satellite and the second satellite.

Example 4 includes the substance of the exemplary antenna system of Example 1, wherein the P UTPs are arranged in a fixed geometry, the fixed geometry being one of a tent, a main panel having multiple side UTPs, a triangular-UTE pyramid, a triangular-UTE pyramid with side UTPs, a geodesic tile dome, and a structure comprising multiple splines.

Example 5 includes the substance of the exemplary antenna system of Example 1, wherein the P UTPs comprise a main panel connected to a plurality of side UTPs, including at least one foldable side UTPs, the antenna system further comprising one or more actuators coupled to the at least two foldable side UTPs, the control circuit further to cause the one or more actuators to adjust angles of the at least two foldable side UTPs.

Example 6 includes the substance of the exemplary antenna system of Example 5, further comprising sensors to measure a signal strength of each UTE, connection to the satellite and a user interface to provide feedback reflecting the strength of the UTE connection, the user interface further configured to receive an indication of an elevation of the satellite includes the substance of the exemplary indication to be used by the control circuit to adjust one or more side panel angles.

Example 7 includes the substance of the exemplary antenna system of Example 5, wherein the control circuit is further configured to attempt to conserve power by powering off one or more inactive side UTPs.

Example 8 includes the substance of the exemplary antenna system of Example 5, wherein the control circuit is further configured to adjust one or more side panel angles in order to attempt to maximize the effective antenna area visible to a moving satellite.

Example 9 includes the substance of the exemplary antenna system of Example 5, further comprising one or more reflectors, each reflector positioned to reflect a connection with the satellite onto one or more of the UTMs.

Example 10 includes the substance of the exemplary antenna system of Example 5, wherein the control circuit is further configured to control a multi-beam connection of the antenna system with a plurality of satellites by causing each of the side UTPs to either be dedicated to a first satellite, or be combined with one or more other side UTPs connected to the first satellite, or switch between connecting to the first satellite and a second satellite.

Example 11 includes the substance of the exemplary antenna system of Example 1, wherein P equals 2 and wherein a first UTP and a second UTP are arranged in a shape of an A-frame tent, the A-frame tent having an adjustable ridge height.

Example 12 includes the substance of the exemplary antenna system of Example 1, wherein the antenna system is arranged as a flat-topped pyramid having one main UTP and four side UTPs.

Example 13 includes the substance of the exemplary antenna system of Example 1, wherein the antenna system is arranged as a teepee having a hexagonal base and six triangular side UTPs.

Example 14 includes the substance of the exemplary antenna system of Example 1, wherein the antenna system comprises six top triangular-shaped UTPs and six side UTPs, the six side UTPs arranged in a hexagonal shape.

Example 15 includes the substance of the exemplary antenna system of Example 1, wherein the antenna system is arranged in a shape of a geodesic dome, the antenna system comprising a plurality of UTPs.

Example 16. The antenna system of Example 1, wherein the antenna system comprises an octagonal main panel atop a plurality of layers of UTPs of concentric, octagonal splines, the layers gradually increasing in diameter.

Example 17 includes the substance of the exemplary antenna system of Example 1, wherein the antenna system comprises a flat main panel configured to tilt about a pivot point, the antenna system further comprising a first actuator coupled to a first side of the main panel and a second actuator coupled to a second, adjacent side of the main panel, wherein the first and second actuators are configured to adjust a title of the main panel.

Example 18 includes the substance of the exemplary antenna system of Example 1, wherein the antenna system is arranged as a flat-topped pyramid having one main UTP and four foldable wing UTPs, each of the four foldable wing UTPs coupled to an actuator configured to adjust an angle of the foldable wing UTP relative to the main UTP.

Example 19 includes the substance of the exemplary antenna system of Example 1, wherein the antenna system comprises an octagonal main panel coupled to eight foldable wing UTPs, the foldable wing UTPs each coupled to an actuator configured to adjust one or more angles of the wing UTPs.

Example 20 includes the substance of the exemplary antenna system of Example 1, wherein the antenna system comprises a square main panel coupled to four foldable reflectors, each foldable reflector coupled to an actuator configured to adjust an angle of the reflector to reflect an incident satellite signal to the main panel.

Example 21 includes the substance of the exemplary antenna system of Example 1, wherein the antenna system comprises four side UTPs arranged as a pyramid but having an open top instead of a flat panel top.

Example 22 includes the substance of the exemplary antenna system of Example 1, wherein the antenna system comprises four side UTPs arranged as a teepee with an open top.

Example 23 provides an exemplary method of connecting an antenna system to a satellite, the method comprising: placing the antenna system in a position, the antenna system comprising P UTPs together comprising N UTMs arranged in either a fixed or a mechanically aided geometry, the N UTMs together comprising M UTEs, the M UTEs comprising M antennas and M active circuits, each antenna either to generate an incoming signal in response to incident radio waves received from a satellite, or to transmit an outgoing signal toward the satellite, and each active circuit to process the incoming and outgoing signals, the antenna system further comprising one or more sensors to measure a total connection signal strength of the N UTMs to the satellite, using a control circuit to control signal processing performed by the M active circuits; and determining whether the total connection signal strength meets a threshold for satellite connectivity, and if not, adjusting one or more of N, M, and the position to adjust an effective antenna area visible to the satellite until the total connection signal strength meets the threshold for satellite connectivity; and wherein the satellite is located at any elevation between zero and ninety degrees.

Example 24 includes the substance of the exemplary method of Example 23, wherein the effective antenna area comprises a sum of projected surfaces of each of the P panels as visible to the satellite, each projected area comprising a rectilinear projection of a UTP surface onto an arbitrary plane perpendicular to a line of sight to the satellite.

Example 25 includes the substance of the exemplary method of Example 23, wherein each panel is further to generate an incoming signal in response to incident radio waves received from a second satellite, or to transmit an outgoing signal toward the second satellite, and wherein N and M can be adjusted so that a second effective antenna area visible to the second satellite and a corresponding throughput of a second connection to the second satellite the method further comprising adjusting N and M so as to maintain the second connection, the second satellite being located at any elevation between zero and ninety degrees, and wherein the Antenna system maintains a multi-beam connection with both the satellite and the second satellite.

Example 26 includes the substance of the exemplary method of Example 23, wherein the P UTPs are arranged in a fixed geometry; the fixed geometry being one of a tent, a main UTP having multiple side UTPs, a triangular-UTP pyramid, a triangular-UTP pyramid with side UTPs, a geodesic tile dome, and a structure comprising multiple splines.

Example 27. The method of Example 23, wherein the P UTPs comprise a main UTP connected to a plurality of side UTPs, including at least two foldable side UTPs, the antenna system further comprising one or more actuators coupled to the at least two foldable side UTPs, the control circuit further to cause the one or more actuators to adjust angles of the at least two foldable side UTPs.

Example 28 includes the substance of the exemplary method of Example 27, wherein the antenna system further comprises a user interface, the method further comprising providing feedback reflecting the total signal strength of the connection, and using the user interface to provide an indication of an azimuth and an elevation of the satellite, and using the indication to by the control circuit to enable one or more side UTPs and adjust one or more side UTP angles.

Example 29 includes the substance of the exemplary method of Example 27, further comprising the control circuit attempting to conserve power by powering off one or more inactive side UTPs.

Example 30 includes the substance of the exemplary method of Example 27, further comprising the control circuit adjusting one or more side panel angles in order to attempt to maximize the effective antenna area visible to a moving satellite.

Example 31 includes the substance of the exemplary method of Example 27, wherein the antenna system further comprises one or more reflectors, each reflector positioned to reflect a connection with the satellite onto one or more of the UTMs.

Example 32 includes the substance of the exemplary method of Example 27, further comprising using the control circuit to control a multi-beam connection of the antenna system with a plurality of satellites, the control circuit causing each of the side UTPs to either be dedicated to a first satellite, or be combined with one or more other side UTPs connected to the first satellite, or switch between connecting to the first satellite and a second satellite.

Example 33 includes the substance of the exemplary method of Example 23, wherein P equals 2 and wherein a first UTP and a second UTP are arranged in a shape of an A-frame tent, the A-frame tent having an adjustable ridge height.

Example 34 includes the substance of the exemplary method of Example 23, wherein the antenna system is arranged as a flat-topped pyramid having one main UTP and four side UTPs.

Example 35 includes the substance of the exemplary method of Example 23, wherein the antenna system is arranged as a hexagonal teepee having six triangular side UTPs.

Example 36 includes the substance of the exemplary method of Example 23, wherein the antenna system is arranged as a teepee having a hexagonal base and six triangular side UTPs.

Example 37 includes the substance of the exemplary method of Example 23, wherein the antenna system is arranged in a shape of a geodesic dome, the antenna system comprising a plurality of UTPs.

Example 38 includes the substance of the exemplary method of Example 23, wherein the antenna system comprises an octagonal main panel atop a plurality of layers of UTPs of concentric, octagonal splines, the layers gradually increasing in diameter.

Example 39 includes the substance of the exemplary method of Example 23, wherein the antenna system comprises a flat main panel configured to tilt about a pivot point, the antenna system further comprising a first actuator coupled to a first side of the main panel and a second actuator coupled to a second, adjacent side of the main panel, wherein the first and second actuators are configured to adjust a title of the main panel.

Example 40 includes the substance of the exemplary method of Example 23, wherein the antenna system is arranged as a flat-topped pyramid having one main UTP and four foldable wing UTPs, each of the four foldable wing UTPs coupled to an actuator configured to adjust an angle of the foldable wing UTP relative to the main UTP.

Example 41 includes the substance of the exemplary method of Example 23, wherein the antenna system comprises an octagonal main panel coupled to eight foldable wing UTPs, the foldable wing UTPs each coupled to an actuator configured to adjust one or more angles of the wing UTPs.

Example 42 includes the substance of the exemplary method of Example 23, wherein the antenna system comprises a square main panel coupled to four foldable reflectors, each foldable reflector coupled to an actuator configured to adjust an angle of the reflector to reflect an incident satellite signal to the main panel.

Example 43 includes the substance of the exemplary method of Example 23, wherein the antenna system comprises four side UTPs arranged as a pyramid but having an open top instead of a flat panel top.

Example 44 provides an exemplary method performed by an antenna system, the method comprising: powering on N UTMs (user terminal modules), the N UTMs disposed on P UTPs (user terminal panels), one or more of the N UTMs being foldable and the N UTMs together comprising M UTEs (user terminal elements), each of the M UTEs comprising an antenna to either generate an incoming signal in response to incident radio waves from a satellite, or to transmit an outgoing signal to the satellite, and an active circuit to process incoming and outgoing signals, the M UTEs further being coupled to one or more signal strength sensors to measure a strength of a connection to the satellite, accessing an azimuth and an elevation of the satellite, using an actuator to fold the one or more foldable UTMs normal to the satellite, transmitting a ping signal toward the satellite, receiving a response to the ping signal from the satellite, using the one or more signal strength sensors to determine that a cumulative strength of the signal received from the satellite by the M UTEs meets a connectivity threshold; and maintaining the connection with the satellite.

Example 45 includes the substance of the exemplary method of Example 44, further comprising powering off one or more UTEs whose signal strength sensors determined that the strength of the signal received from the satellite is lower than a usefulness threshold.

Example 46 includes the substance of the exemplary method of Example 44 further comprising using a user interface to receive the azimuth and the elevation of the satellite, and further using the user interface to provide feedback that the signal received from the satellite has met the connectivity threshold.

Example 47 includes the substance of the exemplary method of Example 44, wherein the azimuth and the elevation are retrieved from one or more of an internet satellite listing, a non-transitory machine-readable medium, and a memory.

Example 48. The method of Example 44, wherein P equals 2 and wherein a first UTP and a second UTP are arranged in a shape of an A-frame tent, the A-frame tent having an adjustable ridge height.

Example 49 includes the substance of the exemplary method of Example 44, wherein the antenna system is arranged as a flat-topped pyramid having one main UTP and four side UTPs.

Example 50 includes the substance of the exemplary method of Example 44, wherein the antenna system is arranged as a teepee having a hexagonal base and six triangular side UTPs.

Example 51 includes the substance of the exemplary method of Example 44, wherein the antenna system is arranged as a teepee having a hexagonal base and six triangular side UTPs.

Example 52 includes the substance of the exemplary method of Example 44, wherein the antenna system is arranged in a shape of a geodesic dome, the antenna system comprising a plurality UTPs.

Example 53 includes the substance of the exemplary method of Example 44, wherein the antenna system comprises an octagonal main panel atop a plurality of layers of UTPs of concentric, octagonal splines, the layers gradually increasing in diameter.

Example 54 includes the substance of the exemplary method of Example 44, wherein the antenna system comprises a flat main panel configured to tilt about a pivot point, the antenna system further comprising a first actuator coupled to a first side of the main panel and a second actuator coupled to a second, adjacent side of the main panel, wherein the first and second actuators are configured to adjust a title of the main panel.

Example 55. The method of Example 44, wherein the antenna system is arranged as a flat-topped pyramid having one main UTP and four foldable wing UTPs, each of the four foldable wing UTPs coupled to an actuator configured to adjust an angle of the foldable wing UTP relative to the main UTP.

Example 56 includes the substance of the exemplary method of Example 44, wherein the antenna system comprises an octagonal main panel and coupled to eight foldable wing UTPs, the foldable wing UTPs each coupled to an actuator configured to adjust one or more angles of the wing UTPs.

Example 57 includes the substance of the exemplary method of Example 44, wherein the antenna system comprises a square main panel coupled to four foldable reflectors, each foldable reflector coupled to an actuator configured to adjust an angle of the reflector to reflect an incident satellite signal to the main panel.

Example 58 includes the substance of the exemplary method of Example 44, wherein the antenna system comprises four side UTPs arranged as a pyramid but having an open top instead of a flat panel top.

Example 59 includes an antenna system which comprises one panel and one or more horn antennas.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. An antenna system comprising:
two or more user terminal panels (UTPs), each UTP comprising:
one or more user terminal modules (UTMs), the one or more UTMs each comprising:
one or more user terminal elements (UTEs), the UTEs comprising:
one or more antennas and two or more active circuits, each antenna configured either to generate an incoming analog signal in response to incident radio waves received from a first satellite, or to transmit an outgoing analog signal toward the first satellite; and
each active circuit configured to process the incoming analog and outgoing analog signals;
one or more sensors configured to measure a connection signal strength of the one or more UTMs to the first satellite; and
wherein the two or more UTPs each have a surface area formed by respective portions of the UTEs, the surface area of the UTPs each oriented in a different direction to one another; and
a control circuit configured to:
send a digital control signal to the two or more active circuits of the UTEs for altering one or more properties of the incoming analog and the outgoing analog signals, wherein the digital control signal is routed along a daisy-chain of the two or more active circuits of the UTEs;
switch connectivity of at least one of the UTPs from the first satellite to a second satellite; and
power down the active circuits of the UTEs of the one or more UTMs, where the UTE does not meet a threshold connection signal strength for satellite connectivity.

2. The antenna system of claim 1, wherein a first UTP and a second UTP of the two or more UTPs are configured in a fixed geometry where the first UTP and second UTP are rotated 180 degrees in an azimuth plane with respect to each other.

3. The antenna system of claim 2, wherein the first UTP and the second UTP are oriented at an elevation angle between 0 and 90 degrees relative to the Earth's horizon.

4. The antenna system of claim 3, wherein the elevation angle of the first UTP and the second UTP provides the threshold connection signal strength for satellite connectivity.

5. The antenna system of claim 2, wherein the control circuit is further configured to electro-mechanically adjust an orientation the first UTP and the second UTP in the azimuth plane.

6. The antenna system of claim 3, further comprising:
a user interface configured to provide an indication of an azimuth and elevation of the first satellite; and
wherein the control circuit further configured to use the indication to control power to the two or more UTPs.

7. The antenna system of claim 1, further comprising:
a user interface configured to provide an indication of the connection signal strength of the one or more UTEs.

8. A method of connecting an antenna system to a satellite, the method comprising:
placing the antenna system in a position, the antenna system comprising:
two or more user terminal panels (UTPs), each UTP comprising:
one or more user terminal modules (UTMs), the one or more UTMs each comprising:
one or more user terminal elements (UTEs), the UTEs comprising:
one or more antennas and two or more active circuits, each antenna configured either to generate an incoming analog signal in response to incident radio waves received from a first satellite, or to transmit an outgoing analog signal toward the first satellite; and
each active circuit configured to process the incoming analog and outgoing analog signals;

one or more sensors to measure a connection signal strength of the one or more UTMs to the first satellite; and wherein the two or more UTPs each have a surface area formed by respective portions of the UTEs, the surface area of the UTPs each oriented in a different direction to one another;

sending a digital control signal, via a control circuit, to the two or more active circuits of the UTEs for altering one or more properties of the incoming analog and the outgoing analog signals, wherein the digital control signal is routed along a daisy-chain of the two or more active circuits of the UTEs;

switching connectivity of at least one of the UTPs from the first satellite to a second satellite;

determining the connection signal strength, via the one or more sensors, of a connection to the first satellite; and if the determined connection signal strength does not meet a threshold value for satellite connectivity, then powering down the one or more UTMs that do not meet the threshold connection signal strength for satellite connectivity.

9. The method of claim 8, further comprising:
combining the incoming signals of the one or more UTEs from a first UTP with the incoming signals of the one or more UTEs from a second UTP.

10. The method of claim 9, further comprising:
combining the outgoing signals of the one or more UTEs from a first UTP with the outgoing signals of the one or more UTEs from a second UTP.

11. The method of claim 8, wherein a first UTP and a second UTP of the two or more UTPs are configured in a fixed geometry where the first UTP and second UTP are rotated 180 degrees in an azimuth plane with respect to each other.

12. The method of claim 11, wherein the first UTP and the second UTP are oriented at an elevation angle between 0 and 90 degrees relative to the Earth's horizon.

13. The method of claim 12, wherein the elevation angle of the first UTP and the second UTP provides the threshold connection signal strength for satellite connectivity.

14. The method of claim 11, further comprising:
electro-mechanically adjusting an orientation of the first UTP and the second UTP in the azimuth plane.

15. The method of claim 12, further comprising:
controlling power to the two or more UTPs based on an azimuth angle and an elevation angle of the first satellite.

16. The method of claim 8, wherein the antenna system further comprises:
providing a user interface configured to display an indication of the connection signal strength of the one or more UTEs.

17. An antenna system comprising:
one or more user terminal panels (UTP), each UTP comprising:
one or more user terminal modules (UTMs), the one or more UTMs each comprising:
one or more antenna elements; and
a first group of one or more active circuits electronically coupled to the one or more antenna elements, the first group of one or more active circuits configured to process an incoming signal received by the one or more antenna elements, and further configured to transmit an outgoing signal by the one or more antenna elements toward a first satellite;

one or more fixed beam antennas positioned on each side of the antenna system;

a second group of one or more active circuits configured to process an incoming signal received by the one or more fixed beam antennas, and further configured to transmit an outgoing signal by the one or more fixed beam antennas toward the first satellite; and a control circuit configured to:
send a first control signals to the first group of one or more active circuits and send a second control signals to the second group of one or one or more active circuits;
wherein the first control signals adjusts a power of the first group of the one or more active active circuits; and
wherein the second control signals adjusts a power of the second group of the one or more active active circuits.

18. The antenna system of claim 17, wherein the first control signals adjusts a power comprises powering off the first group of the one or more active circuits.

19. The antenna system of claim 17, wherein the second control signals adjusts a power comprises powering off the second group of the one or more active circuits.

20. The antenna system of claim 17, wherein the one or more fixed beam antennas comprise feed horn antennas.

21. The antenna system of claim 17, wherein the one or more fixed beam antennas may receive and/or transmit signals at elevation angles different than the antenna elements.

22. The antenna system of claim 17, where the one or more fixed beam antennas are oriented towards Earth's horizon.

23. The antenna system of claim 17, wherein the one or more fixed beam antennas are oriented at an elevation angle between 0 and 90 degrees relative to the Earth's horizon.

24. The antenna system of claim 23, wherein the control circuit is further configured to electro-mechanically adjust an orientation of the one or more fixed beam antennas.

25. The antenna system of claim 17, wherein the antenna system comprises at least 4 fixed beam antennas.

26. The antenna system of claim 25, wherein each of the fixed beam antennas are positioned in a plane below the one or more UTPs.

27. The antenna system of claim 25, wherein at least two pairs of the fixed beam antennas are positioned orthogonal to one another.

28. The antenna system of claim 17, wherein the one or more UTMs each includes multiple antenna elements, each antenna element having a surface area, wherein the surface area of each antenna element is positioned in a common plane.

29. The antenna system of claim 28, wherein the common plane is oriented at an elevation angle of approximately 90 degrees relative to the Earth's horizon.

30. The system of claim 1, wherein the control circuit is further configured to control power being delivered to the two or more active circuits of the UTEs, the power being routed along the daisy-chain of the two or more active circuits of the UTEs.

* * * * *